US009300714B2

(12) United States Patent
Bauer et al.

(10) Patent No.: US 9,300,714 B2
(45) Date of Patent: Mar. 29, 2016

(54) UPSTREAM SIGNAL PROCESSING FOR CLIENT DEVICES IN A SMALL-CELL WIRELESS NETWORK

(75) Inventors: Claus Bauer, San Francisco, CA (US); Brett G. Crockett, Brisbane, CA (US); Charles Q. Robinson, Piedmont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1145 days.

(21) Appl. No.: 13/050,854

(22) Filed: Mar. 17, 2011

(65) Prior Publication Data
US 2011/0169721 A1    Jul. 14, 2011

Related U.S. Application Data

(63) Continuation of application No. PCT/US2009/055835, filed on Sep. 3, 2009.

(60) Provisional application No. 61/098,566, filed on Sep. 19, 2008.

(51) Int. Cl.
*H04L 29/06*  (2006.01)
*G10L 21/0208*  (2013.01)
*H04N 21/214*  (2011.01)

(52) U.S. Cl.
CPC .......... *H04L 65/605* (2013.01); *G10L 21/0208* (2013.01); *H04N 21/214* (2013.01)

(58) Field of Classification Search
CPC ......... H03G 9/005; H03G 9/025; H03G 3/20; G09G 2320/0233; G09G 2320/0633; H04M 1/72569; H04M 2250/12; H04N 21/214; H04N 21/2143; H04N 21/2146

USPC .......................................................... 345/84
See application file for complete search history.

(56) References Cited

U.S. PATENT DOCUMENTS 5,040,065 A     8/1991  Vilard ........................... 348/678
5,133,013 A *   7/1992  Munday ............... G10L 21/0208
                                                      704/226

(Continued)

FOREIGN PATENT DOCUMENTS

EP         1191783        3/2002
JP        10341201       12/1998

(Continued)

OTHER PUBLICATIONS

Office Action on China Patent Application No. 200980136525.5 mailed Dec. 19, 2012 (English translation included).

(Continued)

*Primary Examiner* — Temesgh Ghebretinsae
*Assistant Examiner* — Michael J Jansen, II

(57) ABSTRACT

Methods, apparatuses and program logic in storage media to process media data for quality enhancement. The media data is for rendering at a wireless device. Environmental quantities are accepted from one or more sensors located remote from the wireless device but sufficiently close to be indicative of similar quantities in the device's environment. The sensors at in or connected to a network node. At the network node, the method includes processing the media data using the environmental quantities to generate processed data, and wirelessly sending the processed output to the resource constrained device for rendering, such that the processed output is usable by the resource constrained device to render or to process and render the media data.

27 Claims, 8 Drawing Sheets

(56) References Cited

U.S. PATENT DOCUMENTS

| | | | |
|---|---|---|---|
| 5,802,467 A | 9/1998 | Salazar et al. | |
| 6,249,913 B1* | 6/2001 | Galipeau | H04N 7/17318 348/E5.002 |
| 6,813,777 B1* | 11/2004 | Weinberger | H04B 7/18508 348/E5.008 |
| 6,891,672 B2 | 5/2005 | Whitehead | |
| 7,035,897 B1* | 4/2006 | Devereaux | H04L 67/04 348/211.99 |
| 7,050,966 B2* | 5/2006 | Schneider et al. | 704/200.1 |
| 7,529,545 B2* | 5/2009 | Rader | H04R 25/70 455/268 |
| 7,610,602 B2* | 10/2009 | Ficco | H04N 7/17336 725/75 |
| 7,675,414 B2* | 3/2010 | Ray | H04M 1/72569 340/506 |
| 7,873,114 B2* | 1/2011 | Lin | H04L 25/0202 375/285 |
| 7,936,885 B2* | 5/2011 | Frank | H03G 3/32 340/539.15 |
| 7,945,934 B2* | 5/2011 | Margis | H04N 7/163 725/74 |
| 8,037,500 B2* | 10/2011 | Margis | H04N 7/163 725/74 |
| 8,138,930 B1* | 3/2012 | Heath | G01W 1/00 340/540 |
| 8,744,247 B2* | 6/2014 | Crockett | G10L 21/02 386/285 |
| 2002/0059460 A1 | 5/2002 | Ishida et al. | |
| 2002/0178451 A1* | 11/2002 | Ficco | H04N 7/17336 725/76 |
| 2003/0154055 A1* | 8/2003 | Yoshimura | H04L 67/12 702/188 |
| 2003/0198357 A1* | 10/2003 | Schneider et al. | 381/94.2 |
| 2003/0208764 A1* | 11/2003 | Galipeau | H04N 7/17318 725/76 |
| 2004/0044525 A1 | 3/2004 | Vinton et al. | |
| 2004/0165730 A1 | 8/2004 | Crockett | |
| 2005/0058278 A1* | 3/2005 | Gallego Hugas | G10L 21/0208 379/406.01 |
| 2005/0278754 A1* | 12/2005 | Bleacher | A63F 13/12 725/77 |
| 2006/0002572 A1 | 1/2006 | Smithers et al. | |
| 2006/0107295 A1* | 5/2006 | Margis | H04N 7/163 725/81 |
| 2006/0176169 A1* | 8/2006 | Doolin | G08B 17/00 340/521 |
| 2007/0044126 A1* | 2/2007 | Mitchell | H04N 21/2146 725/81 |
| 2007/0092089 A1 | 4/2007 | Seefeldt et al. | |
| 2007/0127879 A1* | 6/2007 | Frank | H03G 3/32 386/234 |
| 2007/0291959 A1 | 12/2007 | Seefeldt | |
| 2008/0024207 A1* | 1/2008 | Baker | G10L 19/025 327/552 |
| 2008/0033732 A1 | 2/2008 | Seefeldt et al. | |
| 2008/0036591 A1 | 2/2008 | Ray | |
| 2008/0097750 A1 | 4/2008 | Seefeldt et al. | |
| 2008/0167870 A1* | 7/2008 | Hetherington | G10L 21/02 704/233 |
| 2008/0240282 A1* | 10/2008 | Lin | H04L 25/0202 375/285 |
| 2008/0303957 A1* | 12/2008 | Soper | H04N 5/4401 348/725 |
| 2009/0007193 A1* | 1/2009 | Correa | H04H 20/62 725/76 |
| 2009/0228908 A1* | 9/2009 | Margis | H04N 7/163 725/6 |
| 2010/0088736 A1* | 4/2010 | Besen | H04N 21/4122 725/119 |
| 2011/0164855 A1* | 7/2011 | Crockett | H04N 5/91 386/230 |
| 2011/0219407 A1* | 9/2011 | Margis | H04N 7/163 725/75 |
| 2012/0030708 A1* | 2/2012 | Margis | H04N 7/163 725/38 |

FOREIGN PATENT DOCUMENTS

| | | |
|---|---|---|
| JP | 2002223268 | 8/2002 |
| JP | 2004104245 | 4/2004 |
| JP | 2004173173 | 6/2004 |
| JP | 2004350214 | 12/2004 |
| TW | 564372 | 12/2003 |
| TW | I269565 | 12/2006 |
| WO | 9914983 | 3/1999 |
| WO | 9949574 | 9/1999 |
| WO | 0227985 | 4/2002 |
| WO | 2004/111994 | 12/2004 |
| WO | 2005094060 | 10/2005 |
| WO | 2005125099 | 12/2005 |
| WO | 2006/047600 | 5/2006 |
| WO | WO 2007/016107 | 2/2007 |
| WO | 2007/120453 | 10/2007 |
| WO | WO 2007/120452 | 10/2007 |
| WO | WO 2007/123608 | 11/2007 |
| WO | WO 2007/127023 | 11/2007 |
| WO | 2008058327 | 5/2008 |

OTHER PUBLICATIONS

Office Action and Search Report on Taiwan Patent Application No. 098130082 mailed Apr. 2, 2013 (English translation included).

S.J. Elliott and P.A. Nelson, "Active Noise Control," *IEEE Signal Processing Magazine*, Oct. 1993, pp. 12-35.

Sen M. Kuo and Dennis R. Morgan, "Active Noise Control: A Tutorial Review," Proceedings of the IEEE, vol. 87, No. 6, Jun. 1999, pp. 943-973.

Bernard Widrow et al, "Adaptive Noise Cancelling: Principles and Applications," Proceedings of the IEEE, vol. 63, No. 12, Dec. 1975, pp. 1692-1716.

International Preliminary Report on Patentability for PCT Application PCT/US2009/055835 mailed Dec. 23, 2010.

International Search Report and Written Opinion for PCT Application PCT/US2009/055835 mailed Dec. 4, 2010.

Office Action and Search Report on Taiwan Patent Application No. 098130083 mailed May 3, 2013 (English translation included).

Office Action on Japan Patent Application No. 2011-527869 mailed Oct. 16, 2012 (English translation included).

"Bandwidth_extension," from Wikipedia, retrieved Jun. 2, 2008 at http://en.wikipedia.org/wiki/Bandwidth_extension.

Oliver Kunz, "SBR explained: White paper," retrieved Jun. 2, 2008 at http://www.codingtechnologies.com/products/assets/SBR_White_Paper_v1.pdf.

International Preliminary Report on Patentability for PCT Application PCT/US2009/055825 mailed Sep. 24, 2010.

International Search Report and Written Opinion for PCT Application PCT/US2009/055825 mailed Dec. 29, 2009.

Office Action on China Patent Application No. 200980136525.5 mailed Mar. 7, 2012 (English translation included).

Office Action on China Patent Application No. 200980136525.5 mailed Jul. 30, 2012 (English translation included).

Seefeldt, Alan "Loudness Domain Signal Processing" Presented at AES 123rd Convention, New York, USA, Oct. 5-8, 2007; pp. 1-15.

Seetzen, et al., "High Dynamic Range Display Systems" ACM SIGGRAPH conference proceedings, vol. 23, Issue 3. Aug. 2004.

\* cited by examiner

UPSTREAM SIGNAL PROCESSING FOR CLIENT DEVICES IN A SMALL-CELL WIRELESS NETWORK

CROSS-REFERENCE TO RELATED APPLICATIONS

This application is a continuation of International Application No. PCT/US2009/055835 filed 3 Sep. 2009. International Application No. PCT/US2009/055835 claims priority to U.S. Patent Provisional Application No. 61/098,566, filed 19 Sep. 2008. Both International Application No PCT/US2009/055835 and U.S. Application No. 61/098,566 are hereby incorporated by reference in their entirety.

FIELD OF THE INVENTION

The present disclosure relates generally to signal processing of media data, such as signal processing of streaming audio data and of video data.

BACKGROUND

Wireless portable devices continue to grow in popularity and functionality. Such increasingly popular devices include media players such as Apple's iPod, cellular telephones, wireless IP-based telephones such as devices made Helio, Linksys, etc., wireless network compatible multimedia devices such as Microsoft Zune, Apple iPhone, etc., portable gaming consoles such as Sony PSP, Nokia N Gage, etc., and many other devices that can be used to send, receive, and/or render communications and/or multimedia data. Such devices may typically include a processing system, such as a digital signal processor (DSP) or microcontroller and memory that includes software instructions. While such portable devices continue to improve in processing power and functionality, and/or extended battery life, these devices still have limited signal processing capabilities and/or other resources compared to non-portable processing systems such as computers, network adaptors and routers, and/or fixed core network devices. Typically, portable devices are preferably small, preferably inexpensive, have limited processing capabilities, limited memory resources and/or have limited battery power.

Small cell wireless networks such as wireless personal area networks (WPANs) and pico-cell cellular telephone networks are known. These have in common a base station, called a base station in the case of a cellular telephone network, and an access point in the case of a wireless network, that communicate with one or more client devices in a cell. They also have in common a relatively small cell, in the order or meters or less. In such systems, having a small relatively inexpensive client device with relatively long battery life is important.

In stark contrast to the client device, a fixed processing system that a wireless client device communicates with, such as one in a server computer system, a network adaptor, a network router, a wireless base station/access point, and/or some fixed core network device, has significantly greater signal processing capabilities and relatively unlimited access to electric power. Thus, fixed systems typically feature relatively high speed processing capabilities, much larger memory capabilities than portable devices, and virtually unlimited access to electrical power.

In general, a device such as a portable device that has limited resource(s) compared to fixed processing system, is called a "limited resource device herein." A base station refers to an access point, a cellular base station, or a similar wireless transceiver herein that wirelessly transmits media data to a resource limited device.

U.S. Pat. No. 5,802,467 describes a wireless communication, command, control and sensing system for sound and data transmission and reception. WO02/27985 describes a system for automating the volume control to a radio device based on measured parameters.

DESCRIPTION OF EXAMPLE EMBODIMENTS

Overview

Figure 1A:
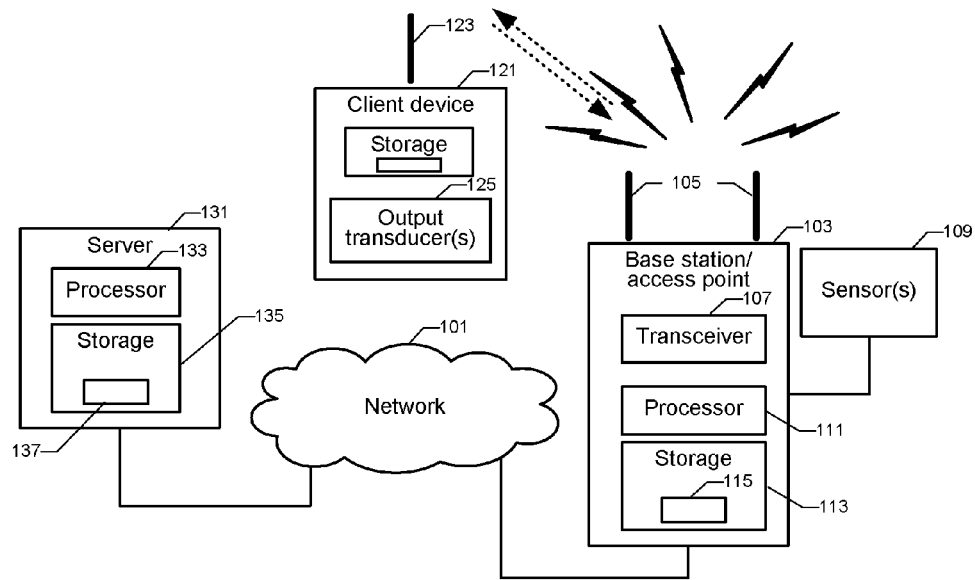
FIGS. 1A and 1B show simplified block diagrams of two different examples of wireless arrangements that include a wireless resource limited device according to embodiments of the present invention.

Embodiments of the present invention include a method, an apparatus, and program logic encoded in one or more computer-readable tangible medium to carry out a method. The method is to carry out quality enhancement signal processing on media data using one or more environmental quantities gathered at a location remote from a resource constrained device but sufficiently close to the resource constrained device such that the environmental quantities are indicative of the same respective in the vicinity of the device. The processing to generate processed output for use by the resource constrained device to render the media data.

Particular embodiments of the invention include a method of processing media data for quality enhancement using processing hardware. The media data is for rendering by a resource constrained wireless device. The method comprises accepting one or more sensed environmental quantities determined from one or more sensors. The sensors are at a location remote from the resource constrained device but sufficiently close to the resource constrained device such that the environmental quantities are indicative of the same respective environmental quantities with the sensors in the vicinity of the resource constrained device. The method further comprises, at a network node located at or coupled to the location remote from the resource constrained device, processing the media data using the environmental quantities to generate processed data, the sensors being in or connected to the network node; and wirelessly sending the processed output to the resource constrained device for rendering, such that the processed output is usable by the resource constrained device to render or to process and render the media data.

In some embodiments of the method, the network node includes a base station of the wireless network.

In some embodiments of the method, the processed output includes processed media data for rendering by the resource constrained device.

Furthermore, in some embodiments of the method, some media data processing occurs at the resource constrained device, and the processed output includes helper data for use by the resource constrained device for the media data processing at the resource constrained device.

In some embodiments of the method, called "streaming embodiments," the media data includes one or more of 1) media data streamed to the resource constrained device, and/or 2) media data interactively streamed across the wireless network to the resource constrained device as part of two-way communication involving the resource constrained device.

In some streaming embodiments, the media data includes audio data, the one or more environmental quantities include at least one quantity indicative of an acoustic profile of noise in the environment, and the quality enhancement processing includes noise compensation. In some versions, the noise compensation includes: generating modification parameters from the audio data using one or more loudness level parameters and the one or more parameters of the acoustic noise profile. The modification parameters are generated by carrying out operations on information in a perceptual loudness domain. The noise compensation further includes modifying the audio data based upon the modification parameters to generate processed audio data. The one or more loudness level parameters include one or more of whether audio noise compensation is turned on, a reference level for the resource constrained device, a desired reproduction level, and/or a noise compensation amount.

In some noise compensation method embodiments, wherein the quality enhancement processing of the media data includes one or more of automatic gain control, dynamic range compression, and/or equalization applied to the audio data.

In some streaming embodiments, the media data includes video data, the one or more environmental quantities include at least one parameter indicative of lighting in the environment, and the quality enhancement processing includes modifying the contrast and/or brightness of the video data according to one or more of the parameters.

In some streaming embodiments, the media data includes video data, the one or more environmental quantities include at least one parameter indicative of lighting in the environment, and the resource constrained device includes a flat panel display device that has location dependent backlighting elements each modulated according to image dependent modulation data sent to the resource constrained device with the video data. The quality enhancement processing includes modifying the contrast and/or brightness of the video data. The data processing at the network node includes generating the image dependent modulation data according to at least one of the one or more parameters.

Particular embodiments include program logic that when executed by at least one processor of a processing system causes carrying out any one of the method embodiments described in this Overview Section. Such program logic, e.g., is embodied in a computer readable storage medium.

Particular embodiments include a computer readable medium having therein program logic that when executed by at least one processor of a processing system causes carrying out any one of the method embodiments described in this Overview Section.

Particular embodiments include an apparatus for carrying out at least part of quality enhancement processing of media data. The apparatus includes a network node configured to wirelessly connect to a resource constrained device, and one or more sensors connected to or in the network node. The sensors are at a location remote from the resource constrained device but sufficiently close to the resource constrained device such that environmental quantities determined from the sensors are indicative of the same respective one or more environmental quantities with the sensors in the vicinity of the resource constrained device. The apparatus further includes processing hardware connected to or in the network node, and configured to accept the one or more environmental quantities and to carry out data processing of media data to achieve quality enhancement using at least some of the accepted environmental quantities to generate processed output. The network node is further configured to wirelessly send the processed output to the resource constrained device, such that the processed output is usable by the resource constrained device to render or to process and render the media data. Some embodiments of the apparatus are configured to carry out any one of the method embodiments described in this Overview Section.

Particular embodiments include an apparatus for carrying out at least part of quality enhancement processing of media data. The apparatus comprises a processing system including at least one processor, and a storage device. The storage device is configured with program logic that when executed causes the apparatus to carry out any one of the method embodiments described in this Overview Section.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

SOME EXAMPLE EMBODIMENTS

Typical Architectures of Some Embodiments

Figure 2A:
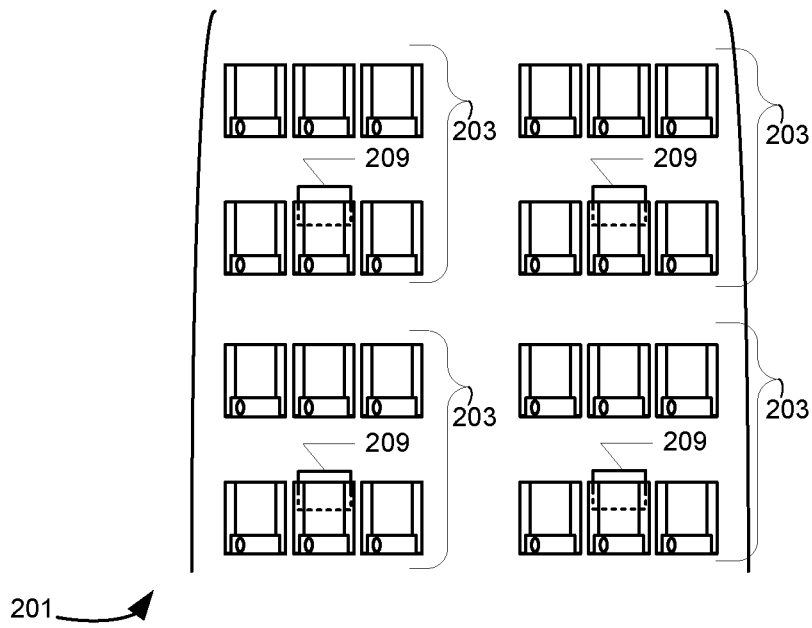
FIG. 2A show a simplified view of several rows of seats in a single aisle passenger airplane in an example application of embodiments of the present invention.
Figure 2B:
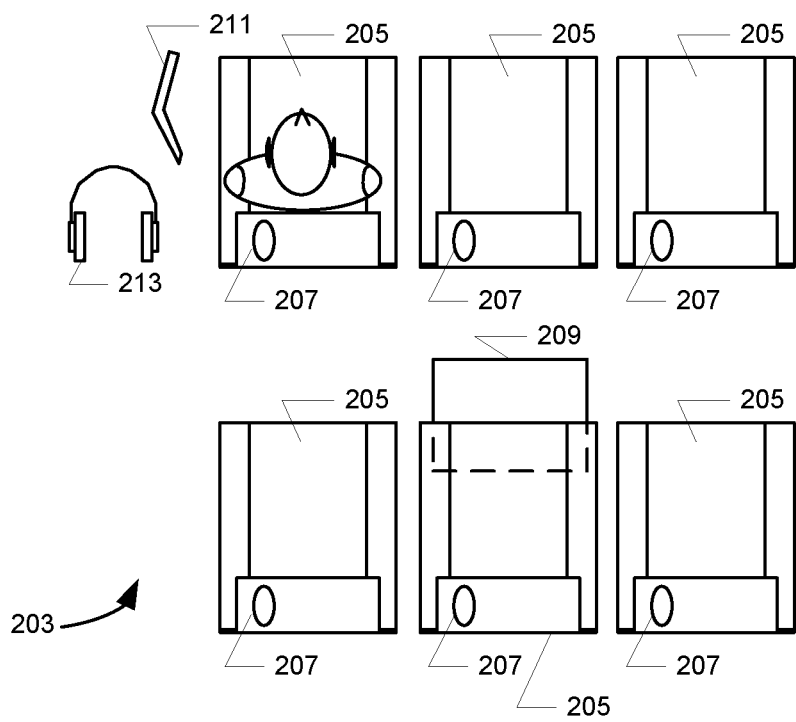
FIG. 2B shows one example pico-cell of six seats, with each seat including a sound input sensor, and with which embodiments of the present invention can operate.

FIGS. 1A and 2B show simplified block diagrams of two different examples of wireless arrangements that include a wireless resource limited device according to embodiments of the present invention.

Figure 1B:
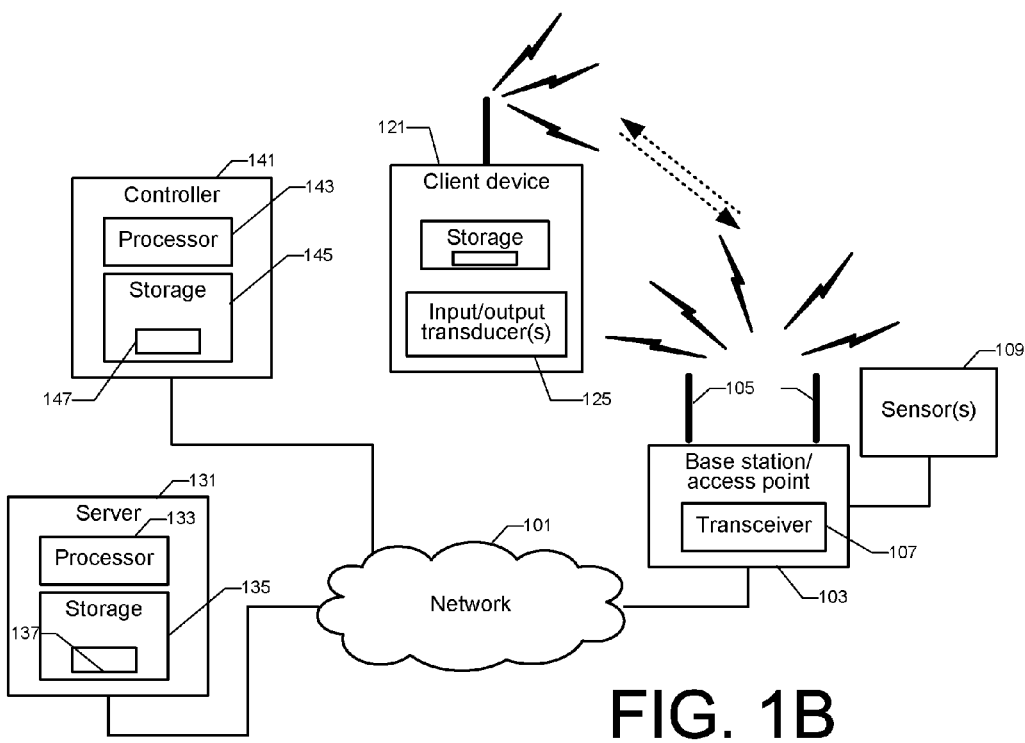
Figure 1C:
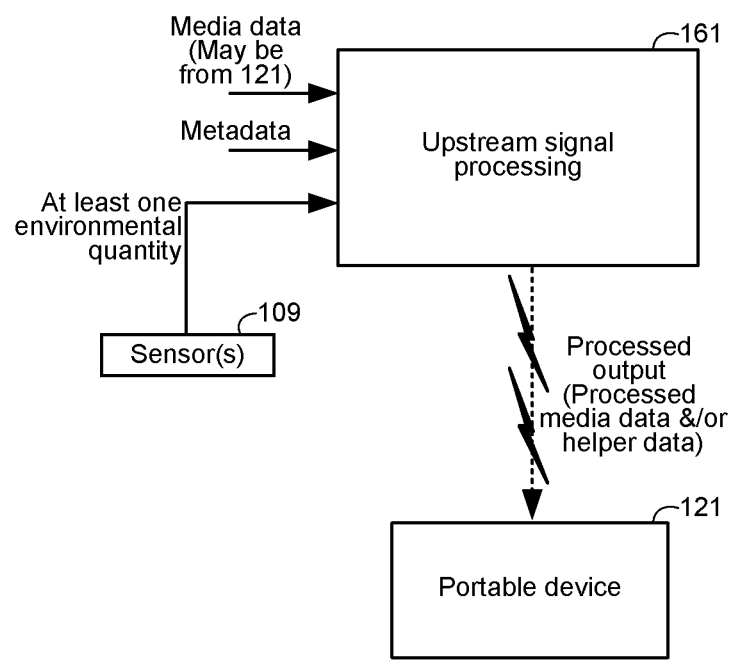
FIG. 1C shows a simplified block diagram of an apparatus embodiment that includes upstream processing of media data and that, for example, describes particular embodiments of FIGS. 1A and 1B.

FIG. 1C shows a simplified block diagram that describes embodiments of the present invention. The particular embodiments shown in each of FIGS. 1A and 1B are each describable by the arrangement of FIG. 1C.

FIG. 1A shows a first example arrangement in which media data is streamed to a client device for rendering at the client device. Included is a network 101 to which is coupled a base station 103. Note that in this description, the terms "base station" are used synonymously and interchangeably. "Base station" is a term commonly used in describing cellular communication networks, while "access point" is a term commonly used in describing infrastructure type wireless local area networks. The base station 103 includes a radio transceiver 107 coupled an antenna subsystem 105 that includes at least one antenna, and a processing subsystem that includes a processor 111 and a storage subsystem 113. The storage subsystem 113 includes one or more memory elements and possible one or more other storage elements such as magnetic disks. Subsystem 113 is collectively referred to as a storage device herein. In some embodiments, the storage device 113 includes program logic 115, e.g., instructions that when executed that cause the base station to carry out methods steps of method embodiments of the invention, as described herein.

The base station is configured to wirelessly communicate with the resource constrained client device 121. In particular, the base station designed to stream media data, such as audio data, or audio data and video data for rendering at the (resource constrained) client device 121. The resource device includes an antenna subsystem 123 for receiving wireless transmissions, e.g., from the base station 103, and one or more transducers, e.g., loudspeakers/earphones for rendering, with other components, audio and/or a display screen for rendering, with other components, video.

One embodiment of the invention is designed to stream media data, such as audio data, or audio data and video data. FIG. 1A includes a source of media data in the form of one or more media server—one example media server 131 shown in the drawing—coupled to the network 101. As is common for such a server, the server 101 includes a processing system including a processor 133 and a storage subsystem 135 that includes memory and possible one or more other storage elements such as optical and/or magnetic media systems. The computer readable storage subsystem 135 includes instructions 137 that when executed by the processor(s) 133 cause the server to serve media data via the network 101.

As one a particular example, the client device 121 is a personal audio playback device, and the output transducer(s) include(s) a headset in an airplane for listening to audio programming streamed via the network 101. As another particular example, the client device 121 is a personal video playback device, and the output transducer(s) include(s) a display screen in an airplane for viewing video data streamed via the network 101. In either case, the media data is streamed for rendering at the resource constrained client device 121, and the resource constrained client device 121 renders the media data for listening/and or viewing via the one or more output transducer 125.

One aspect of the invention includes modifying the media data for rendering by the client device 121 by carrying out signal processing that uses one or more sensed environmental quantities that are indicative of the environment of the client device 121. One or more sensors 109 are configured to sense one or more environmental quantities. Examples of environmental quantities include but are not limited to noise characteristics in the case of audio, and background lighting in the case of video. One aspect of the invention is that the one or more sensors are at a location remote from the client device 121, but sufficiently close to the resource constrained device such that the sensed environmental quantities are indicative of the same respective one or more environmental quantities in the vicinity of the resource constrained device. In the embodiment of FIG. 1A, the sensor(s) 109 is/are at the base station 103, i.e., is/are directly coupled to the base station 103. This limits use of electric power at the resource limited device, and also limits the signal processing amount at the resource limited client device 121.

One aspect of the invention is a method of modifying the media data for rendering by the resource constrained device 121 wirelessly coupled to a wireless network that includes the base station 103. A processing system, e.g., the processing system that includes processor 111, receives the one or more sensed environmental quantities from the sensor(s) 109. The processing system is configured to data process the media data using the received sensed environmental quantities to generate processed output, e.g., processed media data and/pr helper data to be used in the portable device for processing of the media data at the portable device. In one embodiment, such data processing by the processing system includes generating modification parameters using the received sensed environmental quantities, and processing the media data based upon the modification parameters to generate processed media data. The processed media data and/or helper data is sent wirelessly to the resource constrained device 121 for rendering or via the output transducer(s) or processing and rendering. Thus, a signal processing method that uses environmental quantities in the environment of the rendering device 121, but that requires resources that may be constrained in the rendering device 121, can be carried out by a processor does not have the resource limitations of the device 121 and that is remote from the device 121.

Several such signal processing methods that can advantageously use the arrangement shown are described in more detail herein below.

While in some embodiments, the source of media data is upstream and sent from such source to the client device 121, in other embodiments of the present invention, the source of media data is in the client device 121 rather than at a separate device upstream from the network. In such embodiments, the media data is sent upstream to the processing system that includes processor 111. Such processing system received the media data and the one or more sensed environmental quantities.

FIG. 1B describes a second example in which a wireless client device 121 participates in a two-way conversation, e.g., as a mobile telephone via a base station 103 that is coupled to a network 101. Note that the same reference numerals are used herein to reference elements that have similar function to that in FIG. 1A. Details of any particular element, including the means used by the element to achieve the function may be different from embodiment to embodiment, even though the same reference numeral is used. For this example of FIG. 1B, the base station 103 operates differently than that of FIG. 1A in that is a so-called "lightweight" base station that includes minimal components, including a transceiver 107, and whose functionality is controller by a controller 141 that also is coupled to the network 101. The controller 141 includes a processing subsystem that includes at least one processor 143 and a storage subsystem 145. The storage subsystem 145 includes one or more memory elements and possibly one or more other storage elements such as magnetic disks. Subsystem 145 is collectively referred to as a storage device herein. Control data and instructions are communicated via the network by a secure control protocol, such that the base station in combination with the controller operate in a similar manner to a more feature-rich base station such as that shown in FIG. 1A. In some embodiments, the storage device includes instructions, e.g., as a computer program 147 that cause the base station 103 to carry out methods steps of method embodiments of the invention, as described herein.

The base station 103 is configured, e.g., by program in storage subsystem 145 to wirelessly communicate with the resource constrained client device 121. In particular, the base station designed to receive media data as audio data for rendering at the (resource constrained) client device 121 and to receive media data, e.g., audio data collected by a sensor, e.g., a microphone in the client device 121. The resource device includes an antenna subsystem 123 for receiving wireless transmissions, e.g., from the base station 103, and one or more input/output transducers 125, e.g., loudspeakers/earphones for rendering and a microphone for receiving audio.

One embodiment of the invention is designed to interactively stream media data, such as audio data, across the wireless network that includes the base station 103 and the resource to the resource constrained device 121 as part of two-way communication involving the resource constrained device 121. A good example of such an application is a cellular telephone.

In addition to the controller 131, FIG. 1B includes a source of media data in the form of a media server 131 similar to the media server of FIG. 1A that is able to stream media data, e.g., entertainment or other messages, to the resource limited device 121 or some other resource limited device.

One aspect of the invention is modifying the media data for rendering by the client device 121 by carrying out signal processing that uses one or more sensed environmental quantities that are indicative of the environment of the client device 121. One or more sensors 109 are configured to sense one or more environmental quantities. Examples of environmental quantities include but are not limited to noise characteristics in the case of audio, and/or background lighting in the case of video. One aspect of the invention is that the one or more sensors are at a location remote from the client device 121, but sufficiently close to the resource constrained device such that the sensed environmental quantities are indicative of the same respective one or more environmental quantities in the vicinity of the resource constrained device. In the embodiment of FIG. 1B, the sensor(s) 109 is/are at the base station 103, i.e., is/are directly coupled to the base station 103. This limits use of electric power at the resource limited device, and also limits the signal processing amount at the resource limited client device 121.

A processing system, e.g., the processing system that includes processor 143 at the controller 141 via the base station 103 and the network 101 receives the one or more sensed environmental quantities from the sensor(s) 109. The processing system is configured to data process the media data using the received sensed environmental quantities to generate processed output, e.g., media data and/or helper data to be used to further process the media data at the resource constrained device 121. In one embodiment, such data processing by the processing system includes generating modification parameters using the received sensed environmental quantities, and processing the media data based upon the modification parameters to generate processed media data. The controller is configured to cause processed media data and/or the helper data to be sent wirelessly to the resource constrained device 121 for rendering via the output transducer(s) or for use in processing and rendering. Thus, a signal processing method that uses environmental quantities in the environment of the rendering device 121, but that requires resources that may be constrained in the rendering device 121, can be carried out by a processor does not have the resource limitations of the device 121 and that is remote from the device 121.

While in some embodiments, the source of media data is upstream and sent from such source to the client device 121, in other embodiments of the present invention, the source of media data is in the client device 121 rather than at a separate device upstream from the network. Thus, the client device 121 is shown in FIGS. 1A and 1B as including storage wherein media data can be stored. In such embodiments, the media data is sent upstream to the processing system that includes processor 111. Such processing system received the media data and the one or more sensed environmental quantities.

Several quality enhancement signal processing methods that can advantageously use the arrangement shown are described in more detail herein below.

An Example Application

In the examples of FIGS. 1A and 2B, the distance between the sensors and the client device 121 is relatively small. One example is a pico-cell network. Consider, for example, an airplane seat. Suppose the client device is a pair of wireless headphones for listening to material streamed to the clients of the pico-cell via a base station. The pico-cell includes a subset of seats of the set of seats in the airplane. In an alternate application, consider again, for example, an airplane seat and suppose the client device is cellular telephone for carrying on a two-way conversation, including listening to material streamed to the client device of the pico-cell via a base station. The pico-cell includes a subset of seats of the set of seats in the airplane. Suppose as a second example, the wireless client device 121 being a music player that is designed to be wirelessly connected to a picocell, e.g., in the vicinity of an airline seat, and that the airline provides quality enhancement service for music data include stored in the wireless client device 121.

FIG. 2A show a simplified view of several rows of seats 201 in a single aisle passenger airplane in an example application of embodiments of the present invention. In this example two rows of two aisles of seats form a picocell 203, so that four such picocells are shown, each picocell 203 including a base station 209 and up to six seats.

FIG. 2B shows one example picocell 203 of six seats. Each seat 205 includes a sound input sensor, e.g., a microphone 207 in the back of the seat near the head of any passenger. The front-most leftmost seat is shown with a passenger therein. A cell phone 211 is shown in simplified enlarged form for that passenger. Each microphone 207 is directly coupled to the base station. Wireless headphones 213 (also shown in simplified exaggerated enlarged form) are also available as an alternate client device for each passenger.

It is advantageous to have the cell phone handset 211 and the headphones be extremely inexpensive, so to not need much processing, and also to not require much electric power so that recharging and/or battery replacement is infrequent. Yet there is a desire to improve the experience of the passenger, e.g., of the audio transmitted to the passenger by carrying out signal processing that takes into account the environment, e.g., environmental noise in the vicinity of the passenger.

In an alternate scenario, it is advantageous for the airline to provide quality enhancement services for passengers who connect their audio playback device via their picocell wireless network.

Each of client devices 211 and 213 follows the general structure shown in FIGS. 1A and 1B. The base station may be a full base station following the general architecture shown in FIG. 1A, or a lightweight base station following the architecture of FIG. 1B, so a base station using some other architecture.

Note that in alternate versions of the application, fewer microphones 207 are used within a picocell 203. For example, one microphone can be used to obtain background noise quantities for the whole picocell region 203.

While FIGS. 2A and 2B shows applications related to audio, similar applications apply to viewing video or still images on portable video devices that are client devices and that have constrained resources.

A Method Embodiment

Figure 3:
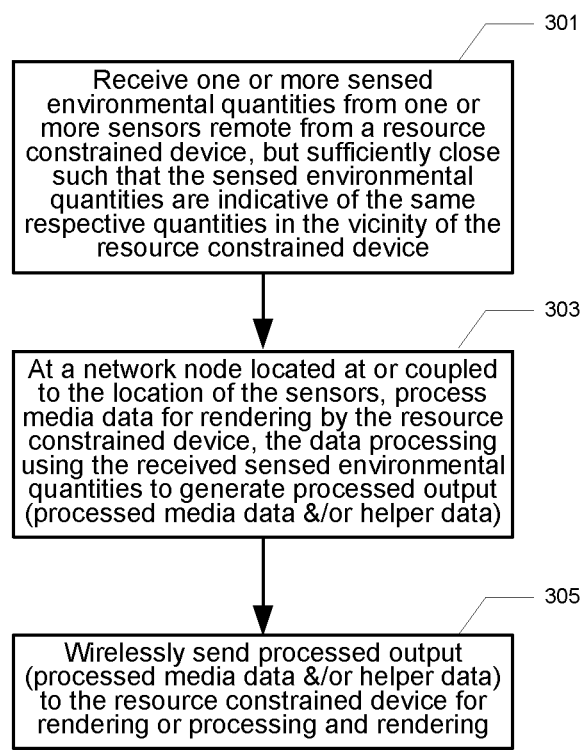
FIG. 3 shows a simplified flowchart of a method embodiment of the present invention.

FIG. 3 shows a simplified flowchart of a method embodiment of the present invention, e.g., as performed by the apparatus shown in FIG. 1C, and the particular example embodiments shown in each of FIG. 1A and FIG. 1B. Shown is a method 300 of modifying media data, e.g., modifying for quality enhancement for rendering by a resource constrained device wirelessly coupled to a wireless network. The method includes in 301 receiving one or more sensed environmental quantities from one or more sensors 109. The sensors 109 are at a location remote from the resource constrained device 121 but sufficiently close to the resource constrained device 121 such that the sensed environmental quantities are indicative of the same respective one or more environmental quantities in the vicinity of the resource constrained device 121.

The method further includes in 303, at a network node 161 located at or coupled to the location of the sensors 109, i.e., the location remote from the resource constrained device 121, data processing the media data using the received sensed environmental quantities to generate processed output, e.g., processed media data, or helper data for use in processing at the resource constrained device, or both processed media data and helper data.

The method includes, in 305, wirelessly sending the processed output (processed media data and/or helper data) to the resource constrained device 121 for rendering, or for processing and rendering at the resource constrained device 121.

In some embodiments, the media data includes audio data, e.g., audio data that is for quality enhancement processing. In some other embodiments, the media data includes video data that is for quality enhancement processing. In some embodiments, the media data includes both audio data that is for quality enhancement processing, and video data that is for quality enhancement processing.

In some embodiments, the network node 161 includes a base station of the wireless network. By the term "base station of the wireless network" is included is included either a base station 131 that itself has the processing power for carrying out the processing, or a base station 131 that is coupled to via a network an element that has the processing power for carrying out the processing. Thus, the term "base station" covers the scenarios of FIG. 1A and also FIG. 1B.

In some embodiments, the media data includes media data streamed to the resource constrained device. In some embodiments, the media data includes media data interactively streamed across the wireless network to the resource constrained device as part of two-way communication involving the resource constrained device. Yet in other embodiments, the media data includes both media data streamed to the resource constrained device and media data includes media data interactively streamed across the wireless network to the resource constrained device as part of two-way communication involving the resource constrained device.

In some embodiments, the media data originates at the wireless client and then sent back to the wireless client after processing.

Types of Processing Using Sensed Environmental Quantities

The present invention is not limited to the type of processing that uses the sensed environmental quantities, and many such types of signal processing operations are known that can advantageously make use of the invention. Quality enhancement signal processing techniques for audio data that can make use of an estimate of the acoustic noise profile in the vicinity of the mobile device's environment include processing that is carried out in a perceptual domain, also called a perceptual loudness domain, or simply a loudness domain. In one embodiment, such processing includes noise compensation. In some noise compensation embodiments, the processing additionally includes one or more of automatic gain control, dynamic range compression, and/or dynamic equalization.

Quality enhancement signal processing techniques for video data can make use of an estimate of the environmental lighting obtained remote from but close to the wireless device include saturation adjustment, brightness adjustment, contrast adjustment, and so forth, including, for example, generating image dependent signals for modulating a set of backlighting elements for a flat panel display device that uses multiple individually modulated light elements, such as LEDs for backlighting for what are called high dynamic range (HDR) displays.

Exampled Embodiments for HDR Displays

HDR displays and the technology behind them are marketed by as DOLBY CONTRAST, DOLBY HDR, and DOLBY VISION by Dolby Laboratories, Inc., related to the assignee of the present invention. HDR displays now being constructed use for a backlight modulated light sources such as modulated light emitting diodes (LEDs). Such backlights are sometimes called IMLED (Individually Modulated Array of LED) backlights. In one version, the brightness of each LED is controlled by an 8-bit signal, so each LED has 256 brightness steps. Rather than having a single light source behind an LCD screen, a plurality of small regions are backlit in a modulated manner according to the local brightness and contrast in the scene being shown.

The modulating signals are obtained by carrying out processing on the video signal to generate signals for modulating the LEDs for the backlighting. For more detail, see for example, Helge Seetzen, Wolfgang Heidrich, Wolfgang Stuerzlinger, Greg Ward, Lorne Whitehead, Matthew Trentacoste, Abhijeet Ghosh, Andrejs Vorozcovs: "High dynamic range display systems," ACM Transactions on Graphics (TOG), Volume 23, Issue 3, Special Issue: Proceedings of the 2004 SIGGRAPH Conference (August 2004). See also U.S. Pat. No. 6,891,672.

The signal processing to determine the modulation signal from a video signal is not trivial. Therefore, a resource constrained viewing device may not be capable of such processing. However, such signal processing can advantageously be carried out in the upstream, according to one or more parameters that are provided, determined or measured close to the environment of the resource constrained viewing device.

Thus, it is known to modify contrast and brightness according to the local viewing conditions, e.g., the brightness of the viewing environment. In one embodiment, an environmental sensor connected to a processing element but remote from the wireless client determines a measure of brightness close to the viewing environment. The environment brightness is provided to the upstream process. In one embodiment, one or more other parameters are sent, e.g., a parameter to indicate the amount of contrast enhancement, a parameter to indicate the brightness setting desired by the viewer and so forth. The upstream processor received such parameters from the resource limited viewing device, and carries out signal processing to determine the levels for the backlighting of the LED devices. Typically, the backlighting is monochromatic, and is a much coarser resolution than the main video. The lower resolution backlighting data is sent together with the video signal to the resource limited device, adjusted according to the received parameters, and is rendered in combination by the resource limited viewing device.

Figure 4:
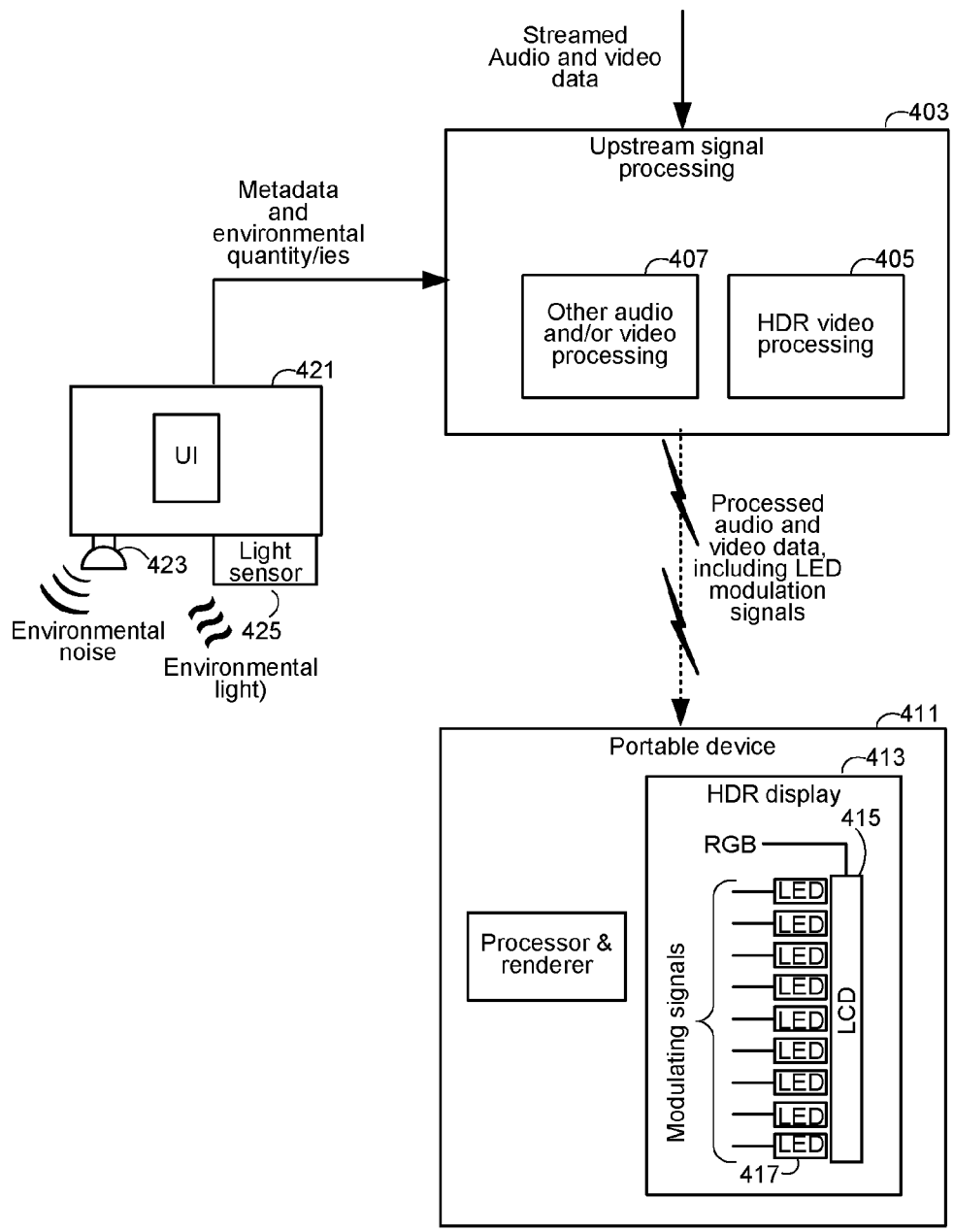
FIG. 4 shows a simplified block diagram of an embodiment of the invention in wherein video data is wirelessly streamed via a signal processing apparatus to a portable device that includes a high dynamic range (HDR) video display.

FIG. 4 shows a simplified block diagram of embodiment of the invention in which media data is streamed via a signal processing apparatus 403 to a portable device, in this case, a wireless device 411 that includes an HDR video display 413 made up of an LCD panel 415 and a number of individually modulated light emitting diode devices 417 that provide spatially dependent modulated backlighting. Such FIG. 4, of course, shows the display 413 is a most simplified two-dimensional form. A device 421 coupled to a signal processing apparatus 403 includes a light sensor 325 configured to measure an indication of ambient light near the wireless portable device 411. In the embodiment shown, a microphone 423 also is included to obtain audio noise environmental quantities, as is a user interface (UI) to provide metadata. The ambient light environmental quantity, at some rate, e.g., once per second, together with one or more other items of metadata related to quality enhancement processing of the audio and/or video, and/or other environmental quantities are provided to the upstream signal processing apparatus 403. The upstream signal processing apparatus includes an HDR signal processor 405 configured to accept the ambient light environmental quantity and video media data, and further configured to process the video data to generate modulation signals usable by the portable device to generate the signals for the individually modulated LED devices 417 in the HDR display 413. The processing is to enhance the contrast in the video according not only to the luminance in the video signal, but additionally according to the ambient lighting in which the video is being viewed at the portable device 411. The processing apparatus 403 additionally may include other audio and/or video quality enhancement processing according or other items of metadata and possible other environmental quantities, e.g., background noise.

In some embodiments, the signal processing block 403 includes a processor and a storage device that includes program logic configured with instructions to carry out method steps according to some embodiments of the present invention.

Exampled Embodiments for Noise Compensation

Figure 5:
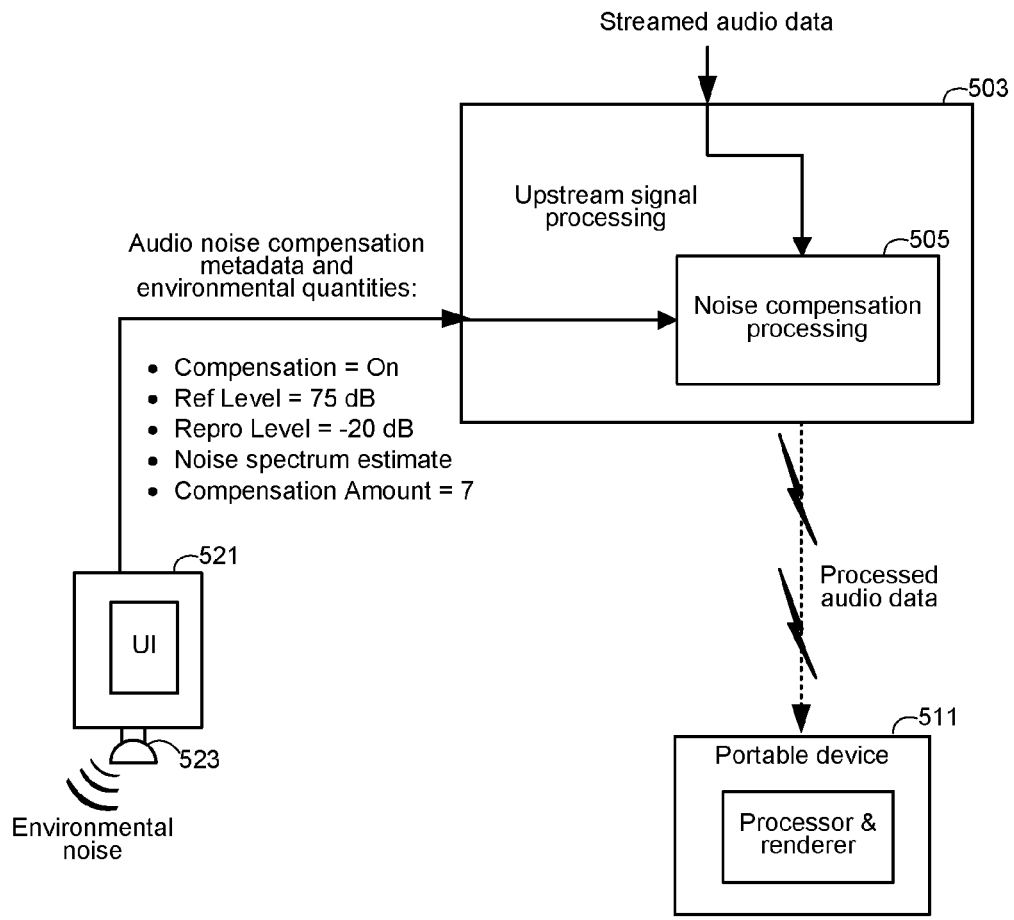
FIG. 5 shows a simplified block diagram of an apparatus that includes an example of noise compensation upstream processing of audio content using metadata and environmental noise information generated remote from a client device, according to an embodiment of the present invention.

FIG. 5 shows a simplified block diagram of an apparatus embodiment in which the media data includes audio data, and at least one environmental quantity is indicative of the acoustic noise profile near the environment of a wireless device 511 measured by at least one sensor 523 from a device 521 that is near the wireless portable device 511. Quality enhancement processing is carried out in an upstream processing block 503 and includes noise compensation using metadata and environmental noise quantities generated by the device 521. Such noise compensation is described below in more detail below. In some such embodiments, noise compensation includes generating modification parameters from the audio data using one or more loudness level parameters and the one or more environmental quantities indicative of an acoustic noise profile. The modification parameters are generated by carrying out operations on information in what is called "a perceptual domain." The noise compensation includes modifying the audio data based upon the modification parameters to generate processed audio data that is wirelessly sent to the portable device 511. As examples, the loudness level parameters include: one or more of whether audio noise compensation is turned on, a reference level for the resource constrained device, a desired reproduction level, and/or a noise compensation amount. In some variants, the processing of the audio data further includes one or more of AGC, dynamic range compression and/or dynamic equalization applied to the audio data. FIG. 5 shows some typical values of metadata and environmental quantities that might be sent. The environmental quantities include an estimate of the noise power, e.g., noise magnitude in a set of some number of bands provides the environmental quantities. These are determined by a processor included in the device 521 that accepts input from an included microphone 523. In one embodiment, 20 noise spectral magnitude values are determined and used. In another, 40 noise spectral magnitude values are used. Those with experience in leveling and noise compensation have found that between carrying out leveling and noise compensation in 20 and 40 frequency bands provides good results based on today's processing capabilities. Of course, as technology progresses, more spectral bands might be used, and in some situations where even the upstream processing is somewhat constrained, fewer frequency bands, and hence spectral noise values might be used. This metadata and environmental quantities are accepted by the upstream signal processing system 503 that has the capacity and capability to perform audio noise compensation, e.g., a system 503 that includes a noise compensation processing block 505.

Typically, the environmental quantities are measured and provided at a much lower rate than the frequency ranges of the audio data, e.g., at around one set of quantities per second.

In some embodiments, the signal processing block 503 includes a processor and a storage device that includes program logic configured with instructions to carry out method steps according to some embodiments of the present invention.

In one embodiment, for loudness-based noise compensation, the following metadata parameters and environmental information provide the information sufficient for upstream signal processing that includes noise compensation processing to process audio data being streamed to a client device, e.g., a portable device. Units used in one embodiment, and some typical values are shown:

Parameter 1: Noise compensation On/Off (0 or 1)
Parameter 2: Portable device reference reproduction level (75 dB)
Parameter 3: Target reproduction level (−20 dB)
Parameter 4: Noise spectrum estimate, e.g., 20 to 40 noise spectral magnitude values sent approximately once a second.
Parameter 5: Noise compensation amount (1-10)

It will be clear to those in the art that FIGS. 4 and 5 describe but a few examples of possible audio data quality enhancement signal processing and/or video data quality enhancement signal processing that can be carried out by different embodiments that have the general structure of FIG. 1C.

Processing in a Perceptual Domain in More Detail

The present invention is not limited to any particular types of quality enhancement processing of audio media data. However, to demonstrate advantageous use of embodiments of the invention, noise compensation—an example of audio quality enhancement signal processing methods that occur in what is called herein, a perceptual domain, also called the perceptual loudness domain, or simply the loudness domain is described in this section. It is known to determine and use in quality enhancement signal processing a measure of perceived loudness in a perceptual domain. See for example, International Patent Application No. PCT/US2004/016964, published as WO 2004111994, titled METHOD, APPARATUS, AND COMPUTER PROGRAM FOR CALCULATING AND ADJUSTING THE PERCEIVED LOUDNESS OF AN AUDIO SIGNAL and International Patent Application No. PCT/US2005/038579 published as WO 2006047600 titled CALCULATING AND ADJUSTING THE PERCEIVED LOUDNESS AND/OR THE PERCEIVED SPECTRAL BALANCE OF AN AUDIO SIGNAL. See also International Patent Application No. PCT/US20075/007946 published as WO 2007120453 titled CALCULATING AND ADJUSTING THE PERCEIVED LOUDNESS AND/OR THE PERCEIVED SPECTRAL BALANCE OF AN AUDIO SIGNAL. Each of these applications designates the United States. The contents of each of such publications WO 2004111994, WO 2006047600 and WO 2007120453 are incorporated herein by reference. See also Alan Seefeldt: "Loudness Domain Signal Processing," paper 7180, *Proceedings, 123rd Convention of the Audio Engineering Society*, New York, N.Y., USA, 5-8 2007. Details of some of the audio quality enhancement signal processing methods described herein are in such published patent applications and the published paper.

The quality enhancement signal processing methods include determining modification parameters from calculations carried out in a perceptual loudness domain, and modifying audio media data according to the modification parameters. By determining the modification parameters in the perceptual loudness domain, greater control over perceptual loudness and perceived spectral balance may be achieved than if such modification parameters were derived in the electrical signal domain. In addition, the use of a basilar-membrane simulating psychoacoustic filterbank or its equivalent in performing loudness domain calculations may provide a more detailed control of the perceived spectrum than in arrangements that derive modification parameters in the electrical signal domain.

Often, audio media data is expected to be reproduced at a specified reference level. However, many times, the media data is played back at reduced levels. It is known that there is variation in the perception of audio depending on the reproduction level. Such variation is related to psychoacoustics and the equal loudness contours and the threshold of hearing in quiet. Altered playback levels can result in dramatic differences in timbre and spatial perception of the audio when compared to the same media data played back at reference level. The quality enhancement signal processing for some embodiments of the invention include determining and adjusting the perceived loudness of an audio signal in an improved manner. A psychoacoustic model is used to calculate a measure of the loudness of an audio signal in perceptual units. Such perceptual domain loudness measure is referred to as specific loudness, and is a measure of perceptual loudness as a function of frequency and time. As one example, a volume control method using parameters determined in a perceptual domain includes using a signal processing method to compute a wideband multiplicative gain, which, when applied to the audio, results in the loudness of the gain-modified audio being substantially the same as a reference loudness. The gain adjusting methods include signal processing methods that analyze and modify the audio depending on playback level restoring it to the way it would be perceived at the reference playback level. This has been found to result in improved imaging, intelligibility and audibility of the audio media data. More details are presented below.

Noise Compensation as Volume Leveling (Optionally with Dynamic Range Control and/or Automatic Gain Control)

Noise compensation is an example of volume leveling in the presence of (and taking into account) noise. Volume leveling, also called loudness leveling and loudness compensated leveling, includes, inter alia, deriving information usable for controlling the specific loudness of an audio signal by modifying the audio signal in order to reduce the difference between its specific loudness and a target specific loudness. In practical implementations, the specific loudness of the modified audio signal may be made to approximate the target specific loudness. The approximation may be affected not only by ordinary signal processing considerations but also time- and/or frequency-smoothing that may be used in the modifying. The methods include determining the perceptual loudness of audio signal in the form of the specific loudness of the audio signal, and determining multi-band gains to apply to multiple bands of the audio signal to modify the audio signal. In some embodiments, modifying of the signal dynamically applies multi-band gain modifications to the audio so that the perceived loudness of the audio media data remains consistent. When such is used in conjunction with the volume control of an audio system, the volume controller is transformed and no longer emulates an electrical resistor that controls the audio signal level being sent to an amplification section. Instead the volume controller now provides input to the leveling method indicating the users desired perceived loudness reproduction level.

Noise Compensation—Leveling in the Presence of Noise Interference

In many audio playback environments there exists background noise that interferes with the audio that a listener wishes to hear. For example, a listener in a moving automobile may be playing music over the installed stereo system and noise from the engine and road may significantly alter the perception of the music. In particular, for parts of the spectrum in which the energy of the noise is significant relative to the energy of the music, the perceived loudness of the music is reduced. If the level of the noise is large enough, the music is completely masked. The quality enhancement signal processing in some embodiments of the present invention include a method to compensate for background noise interfering in an audio playback environment. The partial specific loudness of the audio is defined as the perceptual loudness of the audio in the presence of a secondary interfering sound signal, such as the noise. The signal processing in some embodiments includes determining information usable for controlling the partial specific loudness of an audio signal by modifying the audio signal in order to reduce the difference between its partial specific loudness and a target specific loudness. Doing so mitigates the effects of the noise in a perceptually accurate manner.

Noise Compensation with Automatic Gain Control or Dynamic Range Compressing

Leveling in the presence of noise can be used to determine modification information used to modify the perceived loudness of reproduced audio to match that of the users desired loudness level. This can be used to achieve automatic gain control and/or dynamic range compression. Details of leveling to achieve automatic gain control and dynamic range compressing are described in more detail below.

Dynamic Equalization (DEQ)

Unlike simple leveling in the presence of noise, instead of altering the audio to match a user's desired perceived loudness level, dynamic equalization alters the audio to match a preset or user defined equalization or spectral balance profile. Because specific loudness is a measure of perceptual loudness of an audio signal as a function of frequency and time, in order to reduce the difference between the specific loudness of the audio signal and the target specific loudness, the modifying may modify the audio signal as a function of frequency. Although in some cases the target specific loudness may be time-invariant and the audio signal itself may be a steady-state time-invariant signal, typically, the modifying may also modify the audio signal as a function of time. In the case of a time- and frequency-varying scale factor, the specific loudness may be scaled by the ratio of a measure of a desired spectral shape to the measure of a spectral shape of the audio signal. Such a scaling may be used to transform the perceived spectrum of the audio signal from a time-varying perceived spectrum to a substantially time-invariant perceived spectrum. When the specific loudness is scaled by the ratio of a measure of a desired spectral shape to the measure of a spectral shape of the audio signal, such a scaling may be usable as a dynamic equalizer.

In the case of perceptual domain processing that includes leveling, such as noise compensation, the received sensed environmental quantities includes one or more parameters indicative of an acoustic noise profile of the environment close to the environment of the resource constrained device. The metadata includes one or more loudness leveling parameters. The processing of the media data includes noise compensation, possibly including dynamic range compression and/or equalization applied to the audio data. The noise compensation includes generating modification parameters from the audio data using one or more of the loudness level parameters and the one or more parameters of the acoustic noise profile, and modifying the audio data based upon the modification parameters to generate processed audio data. The modification parameters are generated by carrying out operations on information in a perceptual loudness domain. The one or more loudness level parameters include one or more of a reference reproduction level, a desired reproduction level and/or a leveling amount.

In particular embodiments, the received sensed environmental quantities includes one or more parameters indicative of the acoustic noise profile in the environment of the resource constrained device. The noise compensation applied to the audio data is according to one or more parameters, including (a) one or more of the received sensed environmental quantities, including at least one parameter indicative of the acoustic noise profile in the environment of the resource constrained device, and (b) whether audio noise compensation be turned on, the reference level for the resource constrained device, and/or one or more processing parameters including a desired reproduction level, and a noise compensation amount.

More Detailed Overview of Perceptual Domain-Based Quality Enhancement Processing Throughout the description below, terms such as "filter" or "filterbank" are used to include essentially any form of recursive and non-recursive filtering such as infinite impulse response (IIR) filters or transforms, and finite impulse response (FIR) filters. By "filtered" information is meant the result of applying such filter or filters. Embodiments described below employ filterbanks implemented by transforms.

As described above, audio quality enhancement signal processing operations in a perceptual loudness domain that can beneficially be included in embodiments of the present invention include noise compensation, including leveling in the presence of noise interference. Such noise compensation might beneficially be combined with dynamic range control or automatic gain control, and/or dynamic equalization (DEQ).

Such embodiments include determining the specific loudness of an audio signal and, the specific loudness of noise based on environmental quantities sent from a location close to the location of the resource constrained device. The quality enhancement signal processing include receiving a measure of the noise from one or more sensors remotely located from the resource limited device, but sufficiently close to be indicative of the noise in the environment of the resource limited device, and controlling the partial specific loudness of an audio signal by modifying the audio signal in order to reduce the difference between its partial specific loudness and a target specific loudness. The quality enhancement signal processing may include processing an audio signal by processing the audio signal or a measure thereof in accordance with one or more processes and one or more process-controlling parameters to produce a signal having a target specific loudness.

The target specific loudness may be a function of the audio signal, or not a function of the audio signal. In the latter case, the target specific loudness may be a stored target specific loudness or a target specific loudness received as a parameter, or determined from a received parameter. In such cases, the modifying or the deriving may explicitly or implicitly calculate specific loudness or partial specific loudness. Examples of implicit calculation include, a lookup table or a by calculating a mathematical expression, in which specific loudness and/or partial specific loudness is inherently determined.

A Feed-Forward Arrangement

Figure 6A:
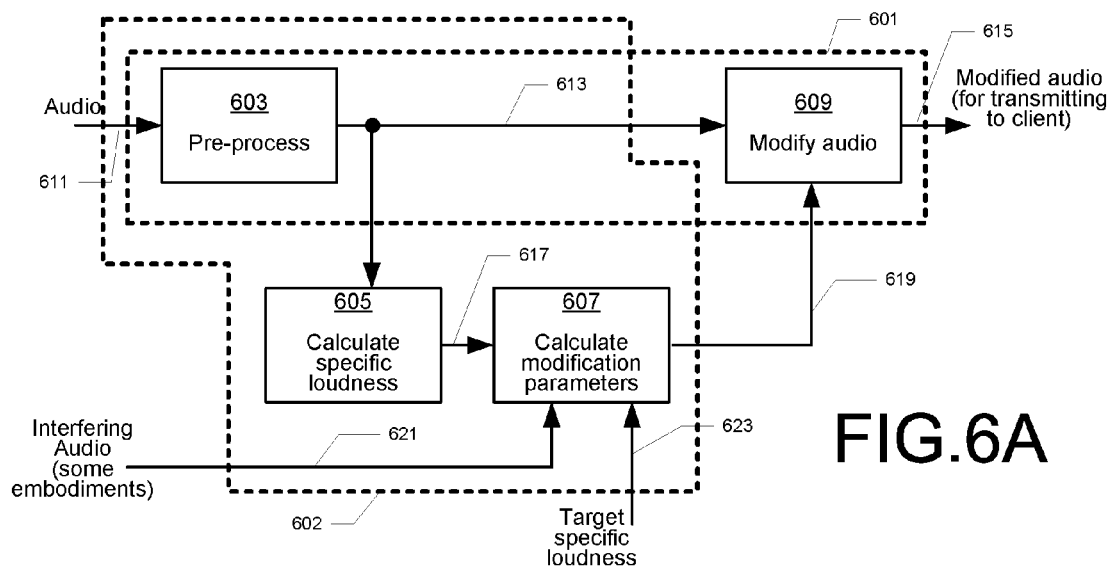
FIGS. 6A-6D show functional block diagrams describing some embodiments of the quality enhancement signal processing in which an audio signal is modified to generate modified audio such that the partial specific loudness—the specific loudness in the presence of interfering noise—is made close to a target specific loudness using a feed-forward arrangement.

FIGS. 6A-6D show functional block diagrams describing some embodiments of the quality enhancement signal processing in which an audio signal is modified to generate modified audio such that the partial specific loudness is made close to a target specific loudness using a feed-forward arrangement. In particular, FIG. 6A shows a feed-forward topology in which an audio signal 611 is applied to two paths: a signal modifying path 601 having one or more processes or devices configured to modify the audio signal 611 in response to one or more modification parameters 619, and a parameter generation control path having a the parameter generation control path 602 configured to generate such modification parameters 619. The signal modifying path 601 in the FIG. 6A feed-forward topology example may be a device or process that modifies the audio signal, for example, its amplitude, in a frequency varying and/or time varying mariner in accordance with modification parameters 619 received from the parameter generation control path 602. In one embodiment, the parameter generation control path 602 operates at least partly in the perceptual loudness domain, while the signal modifying path 601 operates in the electrical signal domain and produces a modified audio signal 615.

The signal modifying path 601 and the parameter generation control path 602 together are configured to modify the audio signal to reduce the difference between its specific loudness and a target specific loudness 623.

In one embodiment, each of the signal modifying path 601 and the parameter generation control path 602 processes a signal that has first been processed by a pre-processing operation or device. Thus, FIG. 6A, includes a pre-processing functional block 603 that produces pre-processed audio 613.

In the FIG. 6A feed-forward example, the parameter generation control path 602 may include several processes and/or devices: In FIG. 6A, the parameter generation control path 602 includes a calculate specific loudness block 605 that includes one or more processes and/or devices configured to calculate the specific loudness 617 of the audio signal in response, in general, to the audio signal 611, or a measure of the audio signals, and in the example embodiment shown, in response to the pre-processed audio signal 613. The parameter generation control path 602 includes a calculate modification parameters block 607 that calculates the modification parameters in response to the specific loudness or excitation 617, the target specific loudness 623 the excitation or specific loudness due to a secondary interfering audio signal 621, such as noise. The calculate modification parameters block 607 thus also receives as input a measure of such a secondary interfering audio signal or the secondary interfering signal itself as one of its inputs. The measure of a secondary interfering signal may be its excitation, as described in more detail herein below and in WO 2006047600 and WO 2007120453. The application of a measure of the interfering signal or the signal itself to the calculate modification parameters block 607 in FIG. 6A permits a suitably configured such process or device to calculate modification parameters 619 that take the interfering signal into account to achieve noise compensation.

In the FIG. 6A feed-forward example, partial specific loudness is not explicitly calculated—the calculate modification parameters block 607 of FIG. 6A calculates the appropriate modification parameters to make the partial specific loudness of the modified audio approximate the target specific loudness 623. In feedback and hybrid configurations, a partial specific loudness also may be calculated.

Figure 6B:
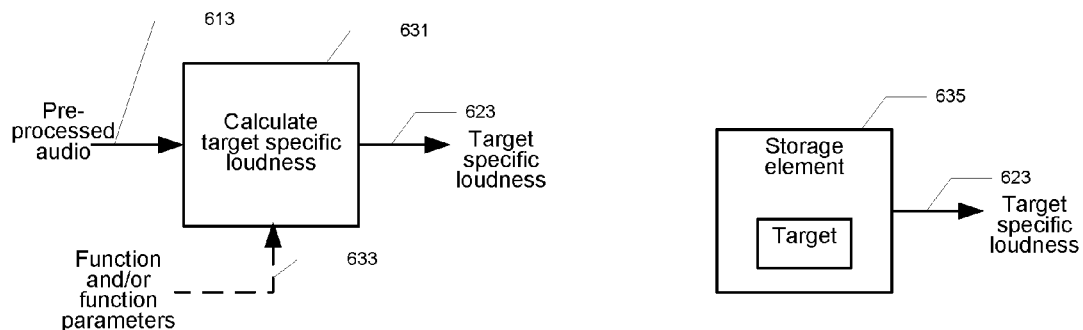

In some embodiments, as shown in FIG. 6B, the target specific loudness for the calculate modification parameters block 607 of control path 602 is determined by a target specific loudness block 631 that includes one or more processes or devices configured to calculate the target specific loudness 623 in response to, in general, the audio signal or a measure thereof, and in the embodiment shown, the pre-processed audio signal 613. Such calculate target specific loudness block 631 may perform one or more functions "F", each of which may have function parameters. For example, it may calculate the specific loudness of the audio signal and then apply one or more functions F to it to provide a target specific loudness 623. This is indicated schematically in FIG. 6B as "Function and/or function parameter" input 633 to the calculate target specific loudness block 631.

Figure 6C:
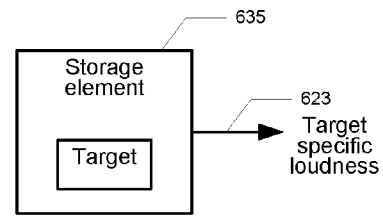

In some embodiments, as shown in FIG. 6C, the target specific loudness 623 may be provided by a storing process or device, shown schematically as a storage element 635, included in or associated with the parameter generation control path 602.

Figure 6D:
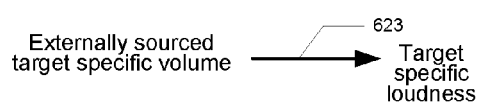

Furthermore, as shown in FIG. 6D, in some embodiments, the target specific loudness 623 is provided by a source external to the overall process or device.

Thus, the modification parameters 619 are based at least in part on calculations in the perceptual (psychoacoustic) loudness domain.

The calculations performed by processes or devices 605 and 607 in the FIG. 6A example, and 631 in FIG. 6B may be performed explicitly and/or implicitly. Examples of implicit performance include (1) a lookup table whose entries are based in whole or in part on specific loudness and/or target specific loudness 623 and/or modification parameter calculations, and (2) a closed-form mathematical expression that is inherently based in whole or in part on specific loudness and/or target specific loudness 623 and/or modification parameters.

Although the calculation blocks 605, 607, and 631 of the FIG. 6A and FIG. 6B examples are shown schematically and described as separate, this is for purposes of explanation only. It will be understood that ones or all of these processes or devices may be combined in a single process or device or combined variously in multiple processes or devices.

The target specific loudness may be a scaling of a measure of the audio signal, such as the specific loudness of the audio signal. For example, as described in detail in WO 2006047600 and WO 2007120453, the scaling may be one or a combination of the following scalings of the specific loudness, in which b denotes a measure of frequency, e.g., a band number in the case the pre-processing 603 divides the input signal into a plurality of frequency bands, t denoted a measure of time, $\tilde{N}[b, t]$ denoted the target specific loudness 623, and $N[b, t]$ denotes the specific loudness 617 of the audio signal 611:

(a) A time- and frequency-varying scale factor $\Xi[b,t]$ scaling of the specific loudness as in the relationship $\tilde{N}[b,t]=\Xi[b,t]N[b,t]$.

(b) A time-varying, frequency-invariant scale factor $\Phi[t]$ scaling of the specific loudness as in the relationship $\tilde{N}[b,t]=\Phi[t]N[b,t]$.

(c) A time-invariant, frequency-varying scale factor $\Theta[b]$ scaling of the specific loudness as in the relationship $\tilde{N}[b,t]=\Theta[b]N[b,t]$.

(d) A time-invariant, frequency-invariant, scale factor $\alpha$ scaling of the specific loudness of the audio signal as in the relationship $\tilde{N}[b,t]=\alpha N[b,t]$.

Thus, the target specific loudness 623 denoted $\tilde{N}[b,t]$ may be expressed as one or more functions, denoted in combination by F of the audio signal or a measure of the audio signal, with the specific loudness $N[b,t]$ being one possible measure of the audio signal, so that $\tilde{N}[b,t]=F(N[b,t])$. Provided that the function or functions F is invertible, the specific loudness $N[b,t]$ of the unmodified audio signal 611 may be calculated as the inverse function or functions $F^{-1}(N[b,t])$ of the target specific loudness 623.

While a feed-forward arrangement is shown in FIG. 6A, is it also known to use feedback and hybrid feed-forward/feedback arrangements in which the inverse function or functions $F^{-1}(\ )$ is calculated. See, for example, WO 2006047600 and WO 2007120453. However, for the sake of brevity of exposition, only the feed-forward configuration is described herein.

Whether using a lookup table, a closed-form mathematical expression, or some other technique, the operation of the parameter generation control path 602 is such that the calculations are based in the perceptual (psychoacoustic) loudness domain even though specific loudness and target specific loudness 623 may not be explicitly calculated. Either there is an explicit specific loudness or there is a notional, implicit specific loudness. Similarly, either there is an explicit target specific loudness 623 or there is a notional, implicit target specific loudness 623. In any case, the calculation of modification parameters seeks to generate modification parameters that modify the audio signal to reduce the difference between specific loudness and a target specific loudness 623.

The modification parameters 619, when applied to the audio signal (or pre-processed audio signal) by the signal modifying path 601, reduce the difference between the partial specific loudness of the resulting modified audio and the target specific loudness 623. Ideally, the partial specific loudness of the modified audio signal 615 closely approximates or is the same as the target specific loudness 623.

In some embodiments, the pre-processing divides the audio signal to a plurality of frequency bands, e.g., using a filterbank. In such embodiments, the modification parameters 619 may, as in the example described in more detail below, take the form of time-varying gain factors applied to the frequency bands derived from a filterbank in 603. In alternate embodiments, the modification parameters 619 are applied to the coefficients of a time-varying filter. Accordingly, in all of the FIG. 6A examples, signal modifying path 601 may be implemented as, for example, a plurality of amplitude scalers, each operating in a frequency band, or a time-varying filter, e.g., a multitapped FIR filter or a multipole IIR filter.

Although not critical or essential to how the specific loudness or partial is determined, some embodiments use in calculating specific loudness block 605 techniques set forth in above-mentioned International Application publication WO 2004/111964, wherein the calculating selects, from a group of two or more specific loudness model functions, one or a combination of two or more of the specific loudness model functions, the selection of which is controlled by the measure of characteristics of the input audio signal.

In accordance with further aspects of the invention, the unmodified audio signal 611 and either (1) the modification parameters 619 or (2) the target specific loudness 623 or a representation of the target specific loudness 623, e.g., scale factors usable in calculating, explicitly or implicitly, target specific loudness 623, may be stored or transmitted for use, for example, in a temporally and/or spatially separated device or process. The modification parameters, target specific loudness 623, or representation of the target specific loudness 623 may be determined in any suitable way. In practice, a feed-forward arrangement, such as in the example of FIG. 6A, is the least complex and fastest inasmuch as it avoids calculations based on the modified audio signal 615.

Figure 7:
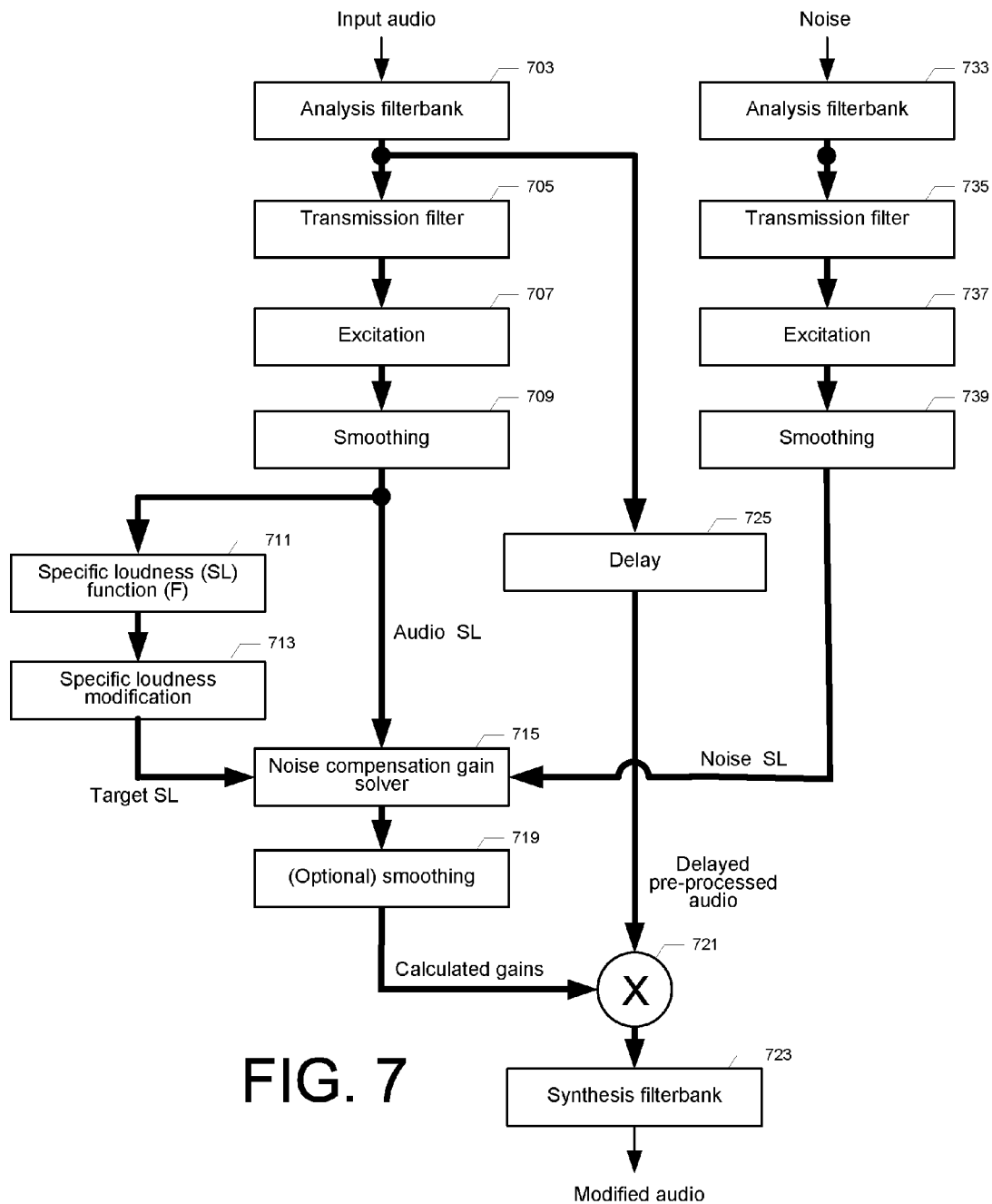
FIG. 7 depicts an example embodiment of an aspect of the invention embodied in a feed-forward arrangement for noise compensation in which the pre-processing separates the input audio into frequency bands.

FIG. 7 depicts greater details of an example embodiment of an aspect of the invention embodied in a feed-forward arrangement in which the pre-processing separates the input audio into frequency bands. In practical embodiments, the processing of the audio is carried out in the digital domain, so that sampling and digitizing of analog signals is carried out. Such details are left out of this description, and would be clear to those in the art.

The Audio 611 first passes through an analysis filterbank function or device 703, which splits the audio signal into a plurality of frequency bands. This is the pre-process 603 for this example embodiment. Thick lines in FIG. 7 indicate multiple signals, so that there are multiple outputs, each a frequency band from analysis filterbank 703. Each of these frequency bands undergoes the various processing steps shown, up to a synthesis filterbank 723, which sums the bands to a combined wideband signal to generate the modified audio signal 615.

The response of the filter associated with each frequency band in the analysis filterbank 703 is designed to simulate the response at a particular location of the basilar membrane in the inner ear of a human. In some embodiments, analysis filterbank 703 includes a set of linear filters whose bandwidth and spacing are constant on the equivalent rectangular bandwidth (ERB) frequency scale.

Analysis filterbank 703 may be implemented efficiently through use of the short-time discrete Fourier transform (short-time DFT, STDFT) or the modified discrete cosine transform (modified DCT, MDCT). The STDFT or MDCT may be used similarly to implement synthesis filterbank 723.

The output of each filter in the analysis filterbank 703 next passes into a transmission filter function or device 705 that is designed to simulate the filtering effect of the transmission of audio through the outer and middle ear of a human.

In order to compute the loudness of the input audio signal, a measure of the audio signals' short-time energy in each filter of the analysis filterbank 703 after application of the transmission filter 705 is obtained. This time and frequency varying measure is referred to as the excitation, denoted E[b,t], where b denotes the frequency band, and t denotes time. To obtain the excitation, the outputs of transmission filter 705 next pass into an excitation function or device 707, the outputs of which are designed to simulate the distribution of energy along the basilar membrane of a human ear. Depending on the desired effects, the excitation energy values may be smoothed across time by a smoothing function or device 709 that are designed to have time constants set in accordance with the requirements of the desired effects of the processing. The output of excitation function 707 is a frequency domain representation of energy denoted E in respective ERB bands denoted b per time denoted t.

A specific loudness function or device 711 converts the smoothed excitation signals into specific loudness in specific loudness (SL). Specific loudness may be represented, e.g., in units of sone per unit frequency, e.g., sone per ERB. Note that from the specific loudness, the overall or total loudness is the sum of the specific loudness across all bands b. Designing the specific loudness function 711 includes determining gains for narrowband and wideband estimated values chosen to match experimental data on the growth of loudness for tones and noise. Furthermore, the specific loudness function 711 is designed such that the specific loudness is some small value instead of zero when the excitation is at the threshold of hearing, and such that the specific loudness decreases monotonically to zero as the excitation decreases to zero. The conversion of excitation E[b,t] to specific loudness denoted N[b,t] is by a function denoted herein by $\Psi\{\bullet\}$, so that the specific loudness denoted N[b,t]=$\Psi\{E[b,t]\}$.

Depending on the particular desired effect or effects of the processing, the specific loudness components associated with the frequency bands are passed into a specific loudness modification function or device 713 that generates a target specific loudness. As described above with reference to FIG. 6B, the target specific loudness in some embodiments, is a function of the input audio's specific loudness, according to the desired effect of the processing. A target specific loudness, for example, may be calculated using a scale factor in the case of volume control. For the case of automatic gain control (AGC), or for the case of dynamic range control (DRC), a target specific loudness may be calculated using a ratio of desired output loudness to input loudness. One embodiment includes rather than performing DRC dependently on every band, smoothing specific loudness denoted N[b,t] across bands so that the amount of DRC applied from one band to the next does not vary as drastically.

In the case of dynamic equalization (DEQ), a target specific loudness may be calculated using a relationship that takes into account the current spectrum of the audio, in particular, the spectrum of the signal is measured and the signal is then dynamically modified in order to transform the measured spectrum into an essentially static desired shape, specified across bands b and referred to as EQ[b]. The spectral shape of the audio signal is denoted by L[b,t], and in one embodiment, is determined as a smoothing of the specific loudness, denoted N[b,t] across time. As with the multiband DRC, one may not want the DEQ modification to vary drastically from one band to the next, and therefore a band-smoothing function may be applied to generate a band-smoothed spectrum. In order to preserve the original dynamic range of the audio, the desired spectrum EQ[b] should be normalized to have the same overall loudness as the measured spectral shape given by L[b,t]. In one embodiment, a parameter is specified, e.g., a parameter that varies from 0 to 1 that expresses the amount of DEQ that is to be applied, with a value 0 indicating no DEQ.

Thus SL modification 713 may operate independently on each band, or there may exist an interdependence between or among bands.

The embodiment also includes measurement of the noise excitation by an analysis filterbank 733, transmission filter 735, excitation 737 and smoothing 739 in a manner corresponding to the operation of blocks 703, 705, 707 and 709. The noise excitation feeds into the gain solver 631 along with the excitation of the audio from smoothing 709 and the target specific loudness from SL modification 713.

Taking as its inputs the smoothed excitation frequency band components from smoother 709, smoothed excitation frequency band components from smoother 739, and the target specific loudness 623 from the SL modification 713, a gain solver function or device 715 is configured to determine the gains that needs to be applied to each band in order to transform the determined partial specific loudness into the target specific loudness 623. The gains determined are in general frequency- and time-varying gains, which, when applied to the original excitations of the audio input and noise, result in a partial specific loudness that, ideally, is equal to the desired target specific loudness, and in practice results in modifying the audio signal in order to reduce the difference between the partial specific loudness and the target specific loudness. The gain solver 515 may be implemented in various ways. If a closed form calculation is possible, it is applied. If a table lookup is possible, such table lookup also may be used. In one embodiment, the gain solver may include an iterative process in which for each iteration, a partial specific loudness is evaluated using a current estimate of the gains. The resulting partial specific loudness is compared with the desired target and the gains are iteratively updated based on the error. Such an iterative method is disclosed in above-mentioned international patent application published as WO 2004111964. Other methods for computing the modification parameters through either explicit or implicit computation of the specific loudness and target specific loudness may be devised, and this invention is intended to cover all such methods.

The gains per band generated by the gain solver 715 may be smoothed further over time by optional smoothing function or device 719 in order to minimize perceptual artifacts. It may alternately be advantageous that temporal smoothing be applied elsewhere in the overall process or device.

Finally, the gains determined by gain solver 715 are applied to respective bands through a respective multiplicative combining function or combiner 721 that applies the gains to the outputs from the analysis filterbank delayed by a suitable delay function or device 725 configured to compensate for any latency associated with the gain computation.

The modified audio 615 is synthesized from the gain-modified bands in a synthesis filterbank function or device 723. As described above, analysis filterbank 703 may be implemented efficiently through use of the short-time DFT or the modified DCT, and the STDFT or MDCT may be used similarly to implement synthesis filterbank 723. The synthesis filters for the bands are determined from the filters used in analysis filterbank 703 and the delay of delay 725.

Note that alternatively, instead of calculating gains for use in applying gain modifications in frequency bards, the gain solvers 715 may calculate filter coefficients that control a time-varying filter, such as a multitapped FIR filter or a multipole IIR filter. For simplicity in exposition, aspects of the invention are mainly described as employing gain factors applied to frequency bands, it being understood that filter coefficients and time-varying filters may also be used in practical embodiments.

For noise compensation, the gains denoted G[b,t] from the gain solver are such that the specific loudness of the processed audio in the presence of the interfering noise is equal to or close to the target specific loudness. To achieve this effect, one may use the concept of partial loudness. Denote by $E_N[b,t]$ represent the excitation from the noise and denote by $E_A[b,t]$ the excitation from the audio with no noise preset. The combined specific loudness of the audio and the noise is given by $$N_{Tot}[b,t]=\Psi\{E_A[b,t]+E_N[b,t]\},$$

where, again, $\Psi\{\bullet\}$ denotes transformation from excitation to specific loudness. One may assume that a listener's hearing partitions the combined specific loudness between the partial specific loudness of the audio and the partial specific loudness of the noise in a way that preserves the combined specific loudness, where the partial specific loudness of the audio, denoted $N_A[b,t]$, is the value one wishes to control, and therefore one must solve for this value. WO 2006047600 and WO 2007120453 describes how the partial specific loudness of the noise may be approximated from $E_N[b,t]$, $N_{Tot}[b,t]$, a masked threshold in the presence of the noise, and the threshold of hearing in quiet at band b, one then can arrive at an expression for the partial specific loudness of the audio $N_A[b,t]$, with the property that when the excitation of the audio is equal to the mask threshold of the noise, the partial specific loudness of the audio is equal to the loudness of a signal at the threshold in quiet, and when the excitation of the audio is much greater than that of the noise, the specific loudness of the audio is approximately equal to what it would be if the noise were not present. In other words, as the audio becomes much louder than the noise, the noise is masked by the audio. The expression includes an exponent value that can be chosen empirically to give a good fit to data on the loudness of a tone in noise as a function of the signal-to-noise ratio. The masked threshold of the noise may be approximated as a function of the noise excitation itself.

For noise compensation, a modified gain solver is used to calculate the gains G[b, t] such that the partial specific loudness of the processed audio in the presence of the noise is equal or close to the target specific loudness.

In its most basic mode of operation, the SL modification 713 in FIG. 7 may simply set the target specific loudness equal to the original specific loudness of the audio N[b,t]. In other words, the SL modification provides a frequency-invariant, scale factor scaling of the specific loudness of the audio signal. With an arrangement such as in FIG. 7, the gains are calculated so that the perceived loudness spectrum of the processed audio in the presence of the noise is equal to the loudness spectrum of the audio in the absence of the noise. Additionally, any one or combination of ones of the previously described techniques for computing the target specific loudness as a function of the original, including volume control, AGC, DRC, and DEQ, may be used in conjunction with the noise compensating loudness modification system.

In a practical embodiment, the measurement of the noise may be obtained from a microphone placed in or near the environment into which the audio will be played. One aspect of the invention is that the measurement the noise is carried out by a sensor coupled to the network element in the system where the signal processing will take place, rather than at the playback resource constrained device.

Comparing FIGS. 6A-6B to FIG. 7, the pre-process clock 603 is carried out by analysis filterbank 703, the modify audio is carried out by the combination of the delay 725, and the gain multiplication 721, and the synthesis filterbank. The calculate specific loudness block 605 is carried out by the combination of transmission filter 705, excitation 707, smoothing 709, and specific loudness function 711. The calculate modification parameters calculates the gains G(b,t) and is carried out by gain solver 715 optionally in combination with the smoothing 719 in the case of no noise compensation, and gain solver 715 in combination with analysis filterbank 733, transmission filter 735, excitation 737, smoothing 739, and specific loudness function 611, and optionally in combination with the smoothing 719. For the various applications, the calculate target specific loudness 631 of FIG. 6B is carried out by specific loudness modification block 713.

While noise compensation possibly with one or more of volume control, AGC, dynamic range control, and/or dynamic equalization is described in some detail herein, this is not meant in any way to limit the type of signal processing that the invention is limited to. The invention is applicable to signal processing operations on media data that can advantageously be carried out in the upstream at a network element where one or more resources sufficient for the processing are available using information that is related to the environment of a resource limited device, but obtained remotely from the resource limited device, to generate processed output that is usable by the resource constrained device to render or to process and render the media data.

Note that while the above description and patent application publications WO 2004111994 and WO 2006047600 describe some methods of determining the specific loudness, other methods also are known for determining the specific loudness. See, for example, WO 2007120453.

In one embodiment, a computer-readable medium is configured with program logic, e.g., a set of instructions that when executed by at least one processor, causes carrying out a set of method steps of methods described herein.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" "portable device" and "resource constrained device" may be used interchangeably to describe any of those multiple other electronic devices, which have the capability of rendering media data. However, the scope of the invention is not limited to devices that are labeled with those terms.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include at least one processor.

Note that when a method is described that includes several elements, e.g., several steps, no ordering of such elements, e.g., ordering of steps is implied, unless specifically stated.

The methodologies described herein are, in one embodiment, performable by one or more processors that accept computer-executable (also called machine-executable) program logic embodied on one or more computer-readable media. The program logic includes a set of instructions that when executed by one or more of the processors carry out at least one of the methods described herein. Any processor capable of executing a set of instructions (sequential or otherwise) that specify actions to be taken are included. Thus, one example is a typical processing system that includes one processor or more than one processor. Each processor may include one or more of a CPU, a graphics processing unit, and a programmable DSP unit. The processing system further may include a storage subsystem that includes a memory subsystem including main RAM and/or a static RAM, and/or ROM. The storage subsystem may further include one or more other storage devices. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The terms storage device, storage subsystem, etc., unit as used herein, if clear from the context and unless explicitly stated otherwise, also encompasses a storage device such as a disk drive unit. The processing system in some configurations may include a sound output device, and a network interface device. The storage subsystem thus includes a computer-readable medium that is configured with, e.g., stores program logic (e.g., software) including a set of instructions to cause performing, when executed by one or more processors, one of more of the methods described herein. The program logic may reside in a hard disk, or may also reside, completely or at least partially, within the RAM and/or within the processor during execution thereof by the processing system. Thus, the memory and the processor also constitute computer-readable medium on which is encoded program logic, e.g., in the form of instructions.

Furthermore, a computer-readable medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that stored the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium configured with a set of instructions, e.g., a computer program that is for execution on one or more processors, e.g., one or more processors that are part of signal processing apparatus. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium configured with, e.g., stores logic including a set of instructions that when executed on one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of program logic, e.g., in a computer readable medium, e.g., a computer program on a computer-readable storage medium, or the computer readable medium configured with computer-readable program code, e.g., a computer program product.

While the computer readable medium is shown in an example embodiment to be a single medium, the term "medium" should be taken to include a single medium or multiple media (e.g., a centralized or distributed database, and/or associated caches and servers) that store the one or more sets of instructions. The term "computer readable medium" shall also be taken to include any computer readable medium that is capable of storing, encoding or otherwise configured with a set of instructions for execution by one or more of the processors and that cause the carrying out of any one or more of the methodologies of the present invention. A computer readable medium may take many forms, including but not limited to non-volatile media and volatile media. Non-volatile media includes, for example, optical, magnetic disks, and magneto-optical disks. Volatile media includes dynamic memory, such as main memory.

It will be understood that the steps of methods discussed are performed in one embodiment by an appropriate processor (or processors) of a processing system (e.g., computer system) executing instructions stored in storage. It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of processing media data for quality enhancement processing, the method comprising:
   receiving the media data at a network node of a wireless network for upstream signal processing on one or both of audio data and video data, the network node having a media rendering device wirelessly coupled thereto, the network node including or coupled to processing hardware that is external to media rendering device, the media rendering device being battery operated, computational-power-limited, or both battery operated and computational-power-limited;
   receiving at the network node to which the media rendering device is wirelessly coupled, one or more environmental quantities determined from one or more sensors located in the vicinity of but not in or on the wireless media rendering device, the environmental quantities related to at least one or both of acoustic noise and lighting in the environment in the vicinity of the media rendering device;
   data processing of the received media data at the network node using the processing hardware included in or coupled to the network node, the data processing being based on the one or more received environmental quantities, the data processing generating processed data; and
   transmitting wirelessly the processed data to the media rendering device for rendering by the media rendering device, or for further processing and rendering by the media rendering device, thereby limiting the use of electric and processing power at the media rendering device,
   wherein the data processing is carried out on one or both of the audio data included in the media data and the video data included in the media data,
   wherein when performing the data processing includes performing the data processing on the audio data included in the media data, the one or more environmental quantities include at least one quantity indicative of an acoustic profile of acoustic noise in the environment of the media rendering device, including a spectral estimate of the acoustic noise sensed in the environment of the media rendering device, the processing the media data for quality enhancement includes the data processing of the audio data by the processing hardware, and comprises generating modification parameters for modifying the audio data, the modifying generating quality-enhanced audio data, and the quality enhancement of the audio includes noise compensation, and
   wherein when performing the data processing includes performing the data processing on the video data included in the media data, the one or more environmental quantities include one or more parameters indicative of lighting in the environment of the media rendering device, the media rendering device includes a flat panel display device that has a display panel and location dependent backlighting elements each backlighting element being configured to provide a variable amount of back-light to a corresponding region of the display panel according to modulation data for the corresponding region while a scene is being displayed, the processing the media data for quality enhancement includes the data processing of the video data by the processing hardware and comprises generating the modulation data according to at least one of the one or more parameters indicative of lighting in the environment of the media rendering device, the generated modulation data is further configured to modulate the intensity of the backlighting elements according to one or more image properties in the corresponding region of the scene being displayed, the generated modulation data is further configured to modulate the intensity of the backlighting elements according to one or more image properties in the corresponding region of the scene being displayed, the one or more image properties including a contrast-related property, a brightness-related property, or both a contrast-related property and a brightness-related property,
   such that at least some of the processing of the media data for quality enhancement is carried out by the processing hardware included in or coupled to the network node.

2. A method as recited in claim 1, wherein the network node includes a base station of the wireless network.

3. A method as recited in claim 1, wherein the generated processed data includes processed media data for rendering by the media rendering device.

4. A method as recited in claim 1, wherein some media data processing occurs at the media rendering device, and wherein the generated processed data includes helper data for use by the media rendering device for the media data processing at the media rendering device.

5. A method as recited in claim 1, wherein the media data received at the network code of the wireless network includes at least one of: media data streamed to the media rendering device, and interactively streamed media data being interactively streamed across the wireless network to the media rendering device as part of two-way communication involving the media rendering device.

6. A method as recited in claim 5, wherein the media data includes the audio data, the one or more environmental quantities include said at least one quantity indicative of an acoustic profile of acoustic noise in the environment of the media rendering device, the data processing at the network node comprises the generating of the modification parameters that apply quality-enhancement to the audio data, and the quality enhancement of the audio includes the noise compensation.

7. A method as recited in claim 6, wherein the noise compensation comprises: generating the modification parameters from the audio data using one or more loudness level parameters and the one or more parameters of the acoustic noise profile, wherein the modification parameters are generated by carrying out operations on information in a perceptual loudness domain, and modifying the audio data based upon the modification parameters to generate processed audio data, and wherein the one or more loudness level parameters include: at least one of the parameters set consisting of: an indication of whether audio noise compensation is turned on; a reference level for the media rendering device; a desired reproduction level, and a noise compensation amount.

8. A method as recited in claim 7, wherein the quality enhancement processing of the media data includes at least one of the set consisting of automatic gain control applied to the audio data, dynamic range compression applied to the audio data, and equalization applied to the audio data.

9. A method as recited in claim 5, wherein the received media data includes media data streamed to the media rendering device, wherein the streamed media data includes the video data, wherein the one or more environmental quantities include the one or more parameters indicative of the lighting in the environment, wherein the media rendering device includes the flat panel display device that has the display panel and the location dependent backlighting element, wherein the processing for quality enhancement includes the generating the modulation data according to at least one of the one or more parameters indicative of lighting in the environment; wherein the generated modulation data is further configured to modulate the intensity of the backlighting elements according to the one or more image properties in the corresponding region of the scene being displayed, and wherein the one or more image properties including a contrast-related property, a brightness-related property, or both a contrast-related property and a brightness-related property.

10. A system for carrying out at least part of quality enhancement processing of media data, the system comprising:
  a network node of a wireless network for upstream signal processing on one or both of audio data and video data, the node being wirelessly connected to a media rendering device, the media rendering device being battery operated, computational-power-limited, or both battery operated and computational-power-limited;
  one or more sensors located in the vicinity of but not in or on the media rendering device, the one or more sensors being connected to or in the network node, the sensors determining one or more environmental quantities, the environmental quantities related to at least one or both of acoustic noise and lighting in the environment in the vicinity of the media rendering device;
  processing hardware external to the media rendering device and connected to or included in the network node, the processing hardware in operation:
  receiving media data comprising audio data, video data, or both audio data and video data,
  accepting the one or more environmental quantities, and
  data processing the media data using at least some of the accepted environmental quantities, the data processing generating processed output,
  wherein the network node in operation wirelessly transmits the processed data to the media rendering device for rendering by the media rendering device or for rendering and further processing by the media rendering device, thereby limiting the use of electric and processing power at the media rendering device,
  wherein the data processing is carried out one or both of audio data included in the media data and video data included in the media data,
  wherein when performing the data processing includes performing the data processing on the audio data included in the media data, the one or more environmental quantities include at least one quantity indicative of an acoustic profile of acoustic noise in the environment of the media rendering device, including a spectral estimate of the acoustic noise sensed in the environment of the media rendering device, the quality enhancement processing includes the data processing of the audio data by the processing hardware and comprises generating modification parameters for modifying the audio data, the modifying generates quality-enhanced audio data, and the quality enhancement of the audio data includes noise compensation, and
  wherein when performing the data processing includes performing the data processing on the video data included in the media data, the one or more environmental quantities include one or more parameters indicative of lighting in the environment of the media rendering device, the media rendering device includes a flat panel display device that has a display panel and location dependent backlighting elements each backlighting element being configured to provide a variable amount of back light to a corresponding region of the display panel according to modulation data for the corresponding region while a scene is being displayed, the processing the media data for quality enhancement includes the data processing of the video data by the processing hardware and comprises generating the modulation data according to at least one of the one or more parameters indicative of lighting in the environment of the media rendering device, the generated modulation data is further configured to modulate the intensity of the backlighting elements according to one or more image properties in the corresponding region of the scene being displayed, the generated modulation data is further configured to modulate the intensity of the backlighting elements according to one or more image properties in the corresponding region of the scene being displayed, the one or more image properties including a contrast-related property, a brightness-related property, or both a contrast-related property and a brightness-related property,
  such that at least some of the media data processing for quality enhancement is carried out by the processing hardware included in or coupled to the network node.

11. A system as recited in claim 10, wherein the network node includes a base station of the wireless network.

12. A system as recited in claim 10, wherein the generated processed data includes processed media data for rendering by the media rendering device.

13. A system as recited in claim 10, wherein some media data processing occurs at the media rendering device, and wherein the generated processed data includes helper data for use by the media rendering device for the media data processing at the media rendering device.

14. A system as recited in claim 10, wherein the media data received at the network code of the wireless network includes at least one of: media data streamed to the media rendering device, and interactively streamed media data being interactively streamed across the wireless network to the media rendering device as part of two-way communication involving the media rendering device.

15. A system as recited in claim 14, wherein the media data includes the audio data, the one or more environmental quantities include said at least one quantity indicative of an acoustic profile of acoustic noise in the environment of the media rendering device, the data processing at the network node comprises the generating of the modification parameters that apply quality-enhancement to the audio data, and the quality enhancement of the audio includes the noise compensation.

16. A system as recited in claim 15, wherein the noise compensation comprises: generating the modification parameters from the audio data using one or more loudness level parameters and the one or more parameters of the acoustic noise profile, wherein the modification parameters are generated by carrying out operations on information in a perceptual loudness domain, and modifying the audio data based upon the modification parameters to generate processed audio data, and wherein the one or more loudness level parameters include: at least one of the parameters set consisting of: an indication of whether audio noise compensation is turned on; a reference level for the media rendering device; a desired reproduction level, and a noise compensation amount.

17. A system as recited in claim 16, wherein the quality enhancement processing of the media data includes at least one of the set consisting of automatic gain control applied to the audio data, dynamic range compression applied to the audio data, and equalization applied to the audio data.

18. A system as recited in claim 14, wherein the received media data includes media data streamed to the media rendering device, wherein the streamed media data includes the video data, wherein the one or more environmental quantities include the one or more parameters indicative of the lighting in the environment, wherein the media rendering device includes the flat panel display device that has the display panel and the location dependent backlighting element, wherein the quality enhancement processing includes the generating the modulation data according to the at least one of the one or more parameters indicative of the lighting in the environment; wherein the generated modulation data is further configured to modulate the intensity of the backlighting elements according to the one or more image properties in the corresponding region of the scene being displayed, and wherein the one or more image properties including a contrast-related property, a brightness-related property, or both a contrast-related property and a brightness-related property.

19. A non-transitory computer-readable storage medium configured with instructions that that when executed by one or more processors of a processing system cause carrying out of a method of processing media data for quality enhancement processing, the method comprising:
receiving the media data at a network node of a wireless network for upstream signal processing on one or both of audio data and video data, the network node having a media rendering device wirelessly coupled thereto, the network node including or coupled to processing hardware that is external to media rendering device, the media rendering device being battery operated, computational-power-limited, or both battery operated and computational-power-limited;
receiving at the network node to which the media rendering device is wirelessly coupled one or more environmental quantities determined from one or more sensors located in the vicinity of but not in or on the wireless media rendering device, the environmental quantities related to at least one or both of acoustic noise and lighting in the environment in the vicinity of the media rendering device;
data processing the received media data at the network node using the processing hardware included in or coupled to the network node, the data processing being based on the one or more received environmental quantities, the data processing generating processed data; and
transmitting wirelessly the processed data to the media rendering device for rendering by the media rendering device, or for further processing and rendering by the media rendering device, thereby limiting the use of electric and processing power at the media rendering device,
wherein the data processing is carried out on one or both of the audio data included in the media data and the video data included in the media data,
wherein when performing the data processing includes performing the data processing on the audio data included in the media data, the one or more environmental quantities include at least one quantity indicative of an acoustic profile of acoustic noise in the environment of the media rendering device, including a spectral estimate of the acoustic noise sensed in the environment of the media rendering device, the processing the media data for quality enhancement includes the data processing of the audio data by the processing hardware, and comprises generating modification parameters for modifying the audio data, the modifying generating quality-enhanced audio data, and the quality enhancement of the audio includes noise compensation, and
wherein when performing the data processing includes performing the data processing on the video data included in the media data, the one or more environmental quantities include one or more parameters indicative of lighting in the environment of the media rendering device, the media rendering device includes a flat panel display device that has a display panel and location dependent backlighting elements each backlighting element being configured to provide a variable amount of back-light to a corresponding region of the display panel according to modulation data for the corresponding region while a scene is being displayed, the processing the media data for quality enhancement includes the data processing of the video data by the processing hardware and comprises generating the modulation data according to at least one of the one or more parameters indicative of lighting in the environment of the media rendering device, the generated modulation data is further configured to modulate the intensity of the backlighting elements according to one or more image properties in the corresponding region of the scene being displayed, the generated modulation data is further configured to modulate the intensity of the backlighting elements according to one or more image properties in the corresponding region of the scene being displayed, the one or more image properties including a contrast-related property, a brightness-related property, or both a contrast-related property and a brightness-related property,
such that at least some of the processing of the media data for quality enhancement is carried out by the processing hardware included in or coupled to the network node.

20. A non-transitory computer-readable storage medium as recited in claim 19, wherein the network node includes a base station of the wireless network.

21. A non-transitory computer-readable storage medium as recited in claim 19, wherein the generated processed data includes processed media data for rendering by the media rendering device.

22. A non-transitory computer-readable storage medium as recited in claim 19, wherein some media data processing occurs at the media rendering device, and wherein the generated processed data includes helper data for use by the media rendering device for the media data processing at the media rendering device.

23. A non-transitory computer-readable storage medium as recited in claim 19, wherein the media data received at the network code of the wireless network includes at least one of:
media data streamed to the media rendering device, and
interactively streamed media data being interactively streamed across the wireless network to the media rendering device as part of two-way communication involving the media rendering device.

24. A non-transitory computer-readable storage medium as recited in claim 23, wherein the media data includes the audio data, the one or more environmental quantities include said at least one quantity indicative of an acoustic profile of acoustic noise in the environment of the media rendering device, the data processing at the network node comprises the generating of the modification parameters that apply quality-enhancement to the audio data, and the quality enhancement of the audio includes the noise compensation.

25. A non-transitory computer-readable storage medium as recited in claim 24, wherein the noise compensation comprises: generating the modification parameters from the audio data using one or more loudness level parameters and the one or more parameters of the acoustic noise profile, wherein the modification parameters are generated by carrying out operations on information in a perceptual loudness domain, and modifying the audio data based upon the modification parameters to generate processed audio data, and wherein the one or more loudness level parameters include: at least one of the parameters set consisting of: an indication of whether audio noise compensation is turned on; a reference level for the media rendering device, a desired reproduction level; and a noise compensation amount.

26. A non-transitory computer-readable storage medium as recited in claim 25, wherein the quality enhancement processing of the media data includes at least one of the set consisting of automatic gain control applied to the audio data, dynamic range compression applied to the audio data, and equalization applied to the audio data.

27. A non-transitory computer-readable storage medium as recited in claim 23, wherein the received media data includes media data streamed to the media rendering device, wherein the received media data includes video data, wherein the one or more environmental quantities include the one or more parameters indicative of the lighting in the environment, wherein the media rendering device includes the flat panel display device that has the display panel and the location dependent backlighting element, wherein the processing for quality enhancement includes the generating the modulation data according to at least one of the one or more parameters indicative of lighting in the environment; wherein the generated modulation data is further configured to modulate the intensity of the backlighting elements according to the one or more image properties in the corresponding region of the scene being displayed, and wherein the one or more image properties including a contrast-related property, a brightness-related property, or both a contrast-related property and a brightness-related property.

* * * * *